United States Patent
Kimura

(10) Patent No.: US 6,877,796 B2
(45) Date of Patent: Apr. 12, 2005

(54) VEHICLE UPPER BODY STRUCTURE

(75) Inventor: Takayuki Kimura, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/701,465

(22) Filed: Nov. 6, 2003

(65) Prior Publication Data

US 2004/0090087 A1 May 13, 2004

(30) Foreign Application Priority Data

Nov. 7, 2002 (JP) ........................................ 2002-323226

(51) Int. Cl.[7] .............................. B62D 25/04; B60J 7/04
(52) U.S. Cl. ........................... 296/187.13; 296/216.07; 296/210; 296/146.6
(58) Field of Search .......................... 296/187.13, 146.1, 296/146.5, 146.6, 210, 216.01, 216.06, 216.07

(56) References Cited

U.S. PATENT DOCUMENTS

| | | | | |
|---|---|---|---|---|
| 3,078,122 | A | * 2/1963 | Werner | 296/216.07 |
| 4,333,680 | A | * 6/1982 | Wolf et al. | 296/16.06 |
| 5,261,722 | A | * 11/1993 | Staley et al. | 296/211 |
| 5,752,737 | A | * 5/1998 | Heldt et al. | 296/146.6 |
| 6,059,352 | A | 5/2000 | Heldt et al. | |
| 6,332,641 | B1 | * 12/2001 | Okana | 296/146.6 |
| 6,409,258 | B1 | 6/2002 | Grimm et al. | |
| 6,481,788 | B1 | * 11/2002 | Moriyama et al. | 296/216.07 |
| 6,659,537 | B2 | * 12/2003 | Moriyama et al. | 296/146.6 |
| 2003/0160476 | A1 | * 8/2003 | Moriyama | 296/202 |

FOREIGN PATENT DOCUMENTS

| | | |
|---|---|---|
| DE | 2543734 A1 * | 10/1975 |
| DE | 100 34 522 A1 | 1/2002 |
| EP | 0188837 A1 * | 7/1986 |
| EP | 1 215 064 A1 | 6/2002 |
| FR | 2 701 677 | 8/1994 |
| JP | 10-297284 | 11/1998 |
| JP | 11-042941 | 2/1999 |
| JP | 2000-280744 | 10/2000 |
| JP | 2001-138864 | 5/2001 |

OTHER PUBLICATIONS

European Search Report dated Feb. 13, 2004.

* cited by examiner

*Primary Examiner*—Patricia L. Engle
(74) *Attorney, Agent, or Firm*—Nixon Peabody LLP; Donald R. Studebaker

(57) ABSTRACT

A vehicle upper body structure, in which a front door and a rear door cover a continuous door opening with no partition in a side part of a vehicle body so that the door opening can be opened and closed, the front door is pivotally attached at its front part to the vehicle body so that the front door can be opened and closed, and the rear door is pivotally attached at its rear part thereof to the vehicle body so that the rear door can be opened and closed, includes: a roof opening which is formed in a roof portion of the vehicle body and through which a vehicle cabin leads to the outside of a vehicle; an opening and closing member which covers the roof opening so that the roof opening can be opened and closed; a roof opening frame which supports the opening and closing member; and a load transmitting member which transmits a load given in the vehicle-width directions, the load transmitting member being disposed at a side part of the roof opening frame such that the load transmitting member is located between the roof opening frame and a position corresponding to free-end upper parts of both doors which are kept closed.

15 Claims, 22 Drawing Sheets

VEHICLE UPPER BODY STRUCTURE

BACKGROUND OF THE INVENTION

1. Field of the Invention

This invention relates to a vehicle upper body structure in which a front door and a rear door of a double-leafed hinged door cover a door opening with no center pillar so that the door opening can be opened and closed, and an opening and closing member covers a roof opening formed in a roof portion so that the roof opening can be opened and closed.

2. Description of the Related Art

As a vehicle side body, the following is known conventionally. According to that, a continuous door opening with no partition is formed in a side part of a vehicle body, and a front door and a rear door cover the door opening so that it can be opened and closed. Then, the front door is pivotally attached on a front-door hinge at its front part to the vehicle body, the rear door is pivotally attached on a rear-door hinge at its rear part to the vehicle body. Next, a side door made up of the front door and the rear door is configured so as to have what is called a double-leafed hinged door structure. In addition, the rear-end part of the front door overlaps with the outside of the front-end part of the rear door, and a reinforcement member which extends in the up-and-down directions is provided on the inside of the front-end part of the rear door (for example, refer to Japanese Patent Laid-Open No. 2001-138864 specification).

As a vehicle upper body structure, there is a well-known sun roof in which a roof opening through which the vehicle cabin leads to the vehicle outside is formed in a roof portion of the vehicle body, the roof opening is covered with an opening and closing member so as to be opened and closed, and a roof opening frame is provided which supports the opening and closing member (for example, refer to Japanese Patent Laid-Open No. 10-297284 specification).

The above described conventional structures configure a vehicle in which a front door and a rear door of a double-leafed hinged door cover a door opening with no center pillar so that the door opening can be opened and closed, and an opening and closing member covers a roof opening so that the roof opening can be opened and closed.

In this vehicle with no center pillar, its vehicle body is less rigid than that of a vehicle with a center pillar, and in addition, a roof opening makes the vehicle body less rigid. Therefore, there has been a great need for making the vehicle body of such a vehicle more rigid.

SUMMARY OF INVENTION

It is an object of the present invention to provide a vehicle upper body structure in which a load transmitting member which transmits a load given in the vehicle-width directions is provided at a side part of a roof opening frame (of either a sun roof or a canvas top) such that the load transmitting member is located between the roof opening frame and a position corresponding to free-end upper parts of front and rear doors which are kept closed. This vehicle upper body structure is capable of dispersing a load (i.e., a load given from the outside to the inside of the vehicle-width directions) at the time when the doors are kept closed, by allowing the load transmitting member to bear the load and transmit it to the roof opening frame, and thereby, of making the vehicle body of a non-center pillar vehicle with a roof opening more rigid.

A vehicle upper body structure according to the present invention, in which a front door and a rear door cover a continuous door opening with no partition in a side part of a vehicle body so that the door opening is opened and closed, the front door is pivotally attached at a front part thereof to the vehicle body so that the front door is opened and closed, and the rear door is pivotally attached at a rear part thereof to the vehicle body so that the rear door is opened and closed, comprises: a roof opening which is formed in a roof portion of the vehicle body and through which a vehicle cabin leads to the outside of a vehicle; an opening and closing member which covers the roof opening so that the roof opening is opened and closed; a roof opening frame which supports the opening and closing member; and a load transmitting member which transmits a load given in the vehicle-width directions, the load transmitting member being disposed at a side part of the roof opening frame such that the load transmitting member is located between the roof opening frame and a position corresponding to free-end upper parts of both doors which are kept closed.

Herein, as the roof opening frame according to this configuration, either a roof for a sun roof or a roof for a canvas top may also be used. As for the load transmitting member, it may be disposed precisely sideways or inclined.

According to the above described configuration, the load transmitting member disperses a load (i.e., a load given from the outside to the inside of the vehicle-width directions) at the time when the doors are kept closed, by bearing the load and transmitting it to the roof opening frame, and thereby, the vehicle body of a non-center pillar vehicle with a roof opening becomes more rigid. This is advantageous to the vehicle, even when it is bumped at its side part.

These and other objects, features and advantages of the present invention will become more apparent upon reading of the following detailed description along with the accompanied drawings.

DETAILED DESCRIPTION OF INVENTION

Hereinafter, the vehicle upper body structure according to an embodiment of the present invention will be described in detail with reference to the accompanied drawings.

Figure 1:
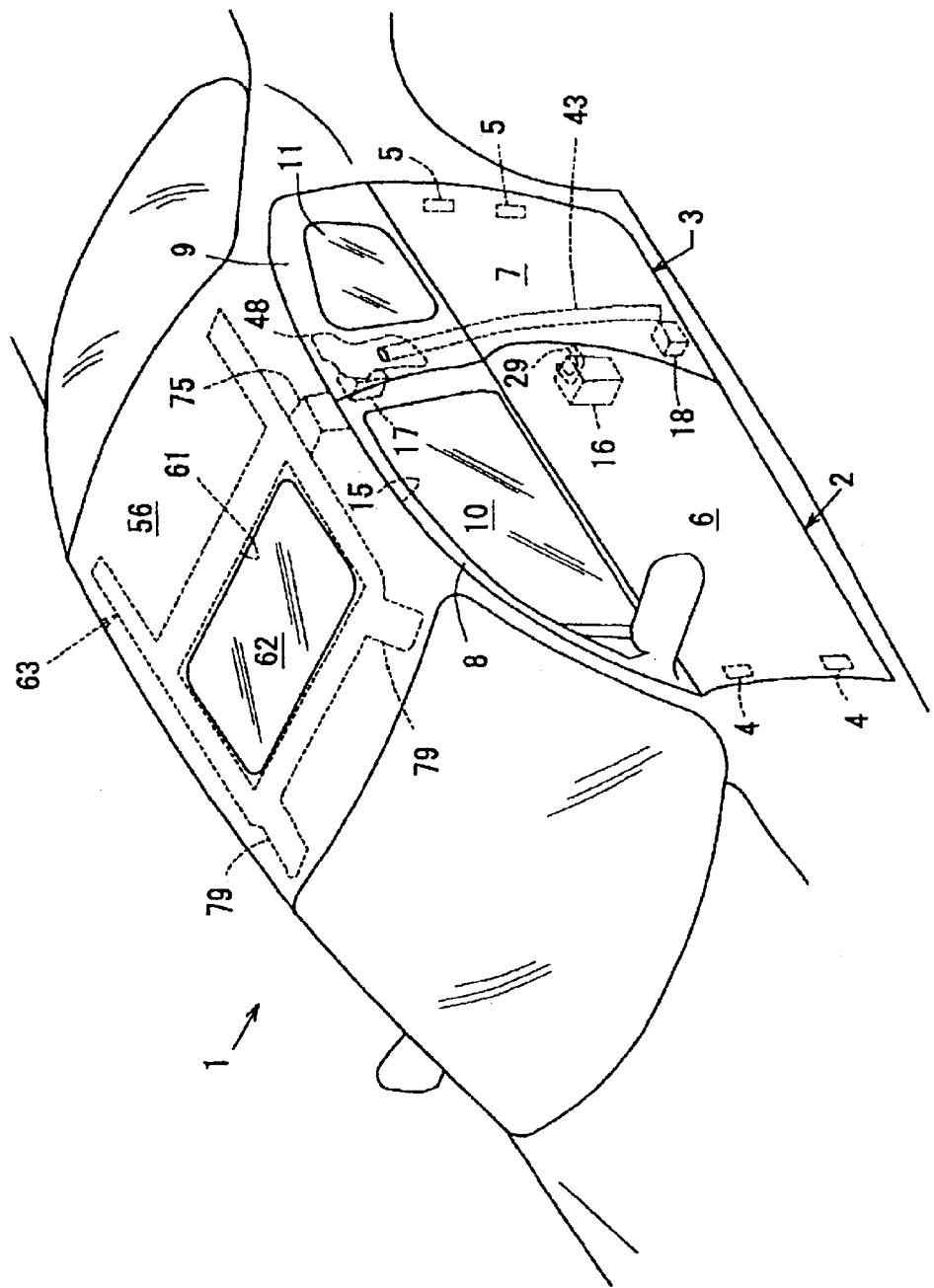
FIG. 1 is a perspective view of a vehicle including an upper vehicle-body structure according to the present invention.
Figure 2:
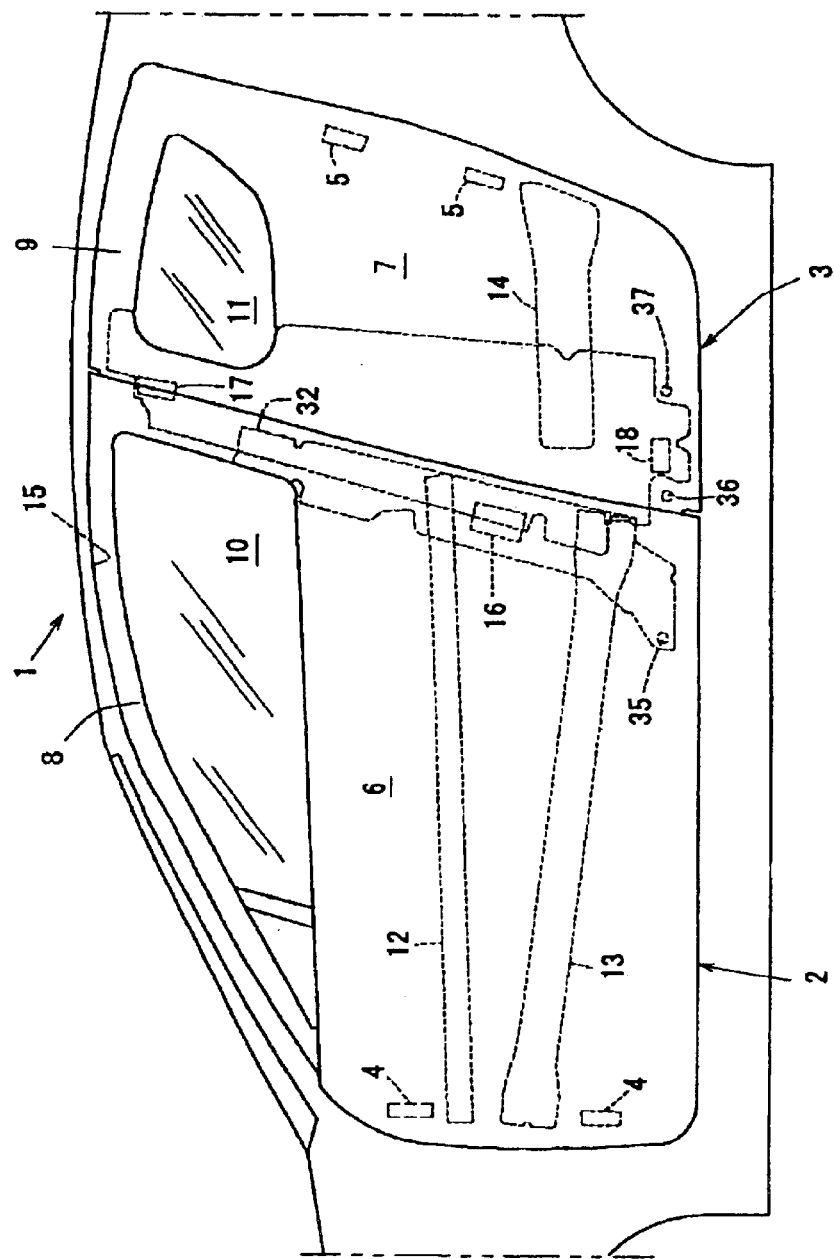
FIG. 2 is a side view of the vehicle.

Those drawings show the vehicle upper body structure, however, the vehicle side-door structure will first be described, referring to FIG. 1 to FIG. 8. FIG. 1 and FIG. 2 show a side door of a vehicle, which has a freestyle structure (or a double-leafed hinged structure). In those figures, a side door configured by a front door 2 and a rear door 3 is provided on the vehicle-body side of a vehicle 1. In the front-end part of the front door 2 and the rear-end part of the rear door 3, a front-door hinge 4 and a rear-door hinge 5 are provided as a hinge portion, respectively. Each door hinge 4, 5 includes a door-side hinge bracket, a hinge pin and a body-side hinge bracket.

The front door 2 is pivotally attached on the front-door hinges 4, 4 to a hinge pillar used as a vehicle-body rigid member, so that it can be opened and closed. The rear door 3 is pivotally attached on the rear-door hinges 5, 5 to a rear body, so that it can be opened and closed. Both the front door 2 and the rear door 3 cover a continuous door opening portion 15 with no partition, or a door opening portion 15 with no center pillar, in a side part of the vehicle so that the opening is opened and closed.

The front door 2 and the rear door 3, which configures the side door, includes door main bodies 6, 7, door sash portions 8, 9, and a window glass 10 (but, also including a resin-made member) and a flip window member 11, respectively. Inside the door main bodies 6, 7, impact bars 12, 13 and a lateral impact bar 14 are provided which extends in the front-and-rear directions of the vehicle, respectively.

In the doors 2, 3 having a double-leafed hinged door structure according to this embodiment, the front door 2 is opened ahead of the rear door 3. In other words, the rear door 3 cannot be opened unless the front door 2 is opened.

Each of the doors 2, 3 opens and closes the door opening portion 15 with no center pillar. As shown in FIG. 1 and FIG. 2, a door latch 16 (or a front-side lock portion) which can be hooked to and unhooked from the rear door 3 is provided at a rear-end part of the front door 2. The door latch 16 is locked by a striker 29 (or a rear-side lock portion) provided at a front-end part of the rear door 3. At upper and lower parts of the front-end part of the rear door 3, door latches 17, 18 are provided which can be hooked to and unhooked from a vehicle body. These door latches 17, 18 are locked by strikers 19, 20 on the body side (mentioned later with reference to FIG. 7), respectively. Herein, the strikers 19, 20 are disposed at an upper-side part and at a lower-side part of the door opening portion 15, respectively.

In other words, a locking mechanism is configured by the door latch 16 at a rear part of the front door 2 and the striker 29 at a front part of the rear door 3. A door upper-part locking mechanism is configured by the door latch 17 (or a door-side lock portion) at a front-end upper part of the rear door 3 and the striker 19 on the body side (or a vehicle body-side lock portion). A door lower-part locking mechanism is configured by the door latch 18 (or a door-side lock portion) at a front-end lower part of the rear door 3 and the striker 20 on the body side (or a vehicle body-side lock portion).

Figure 3:
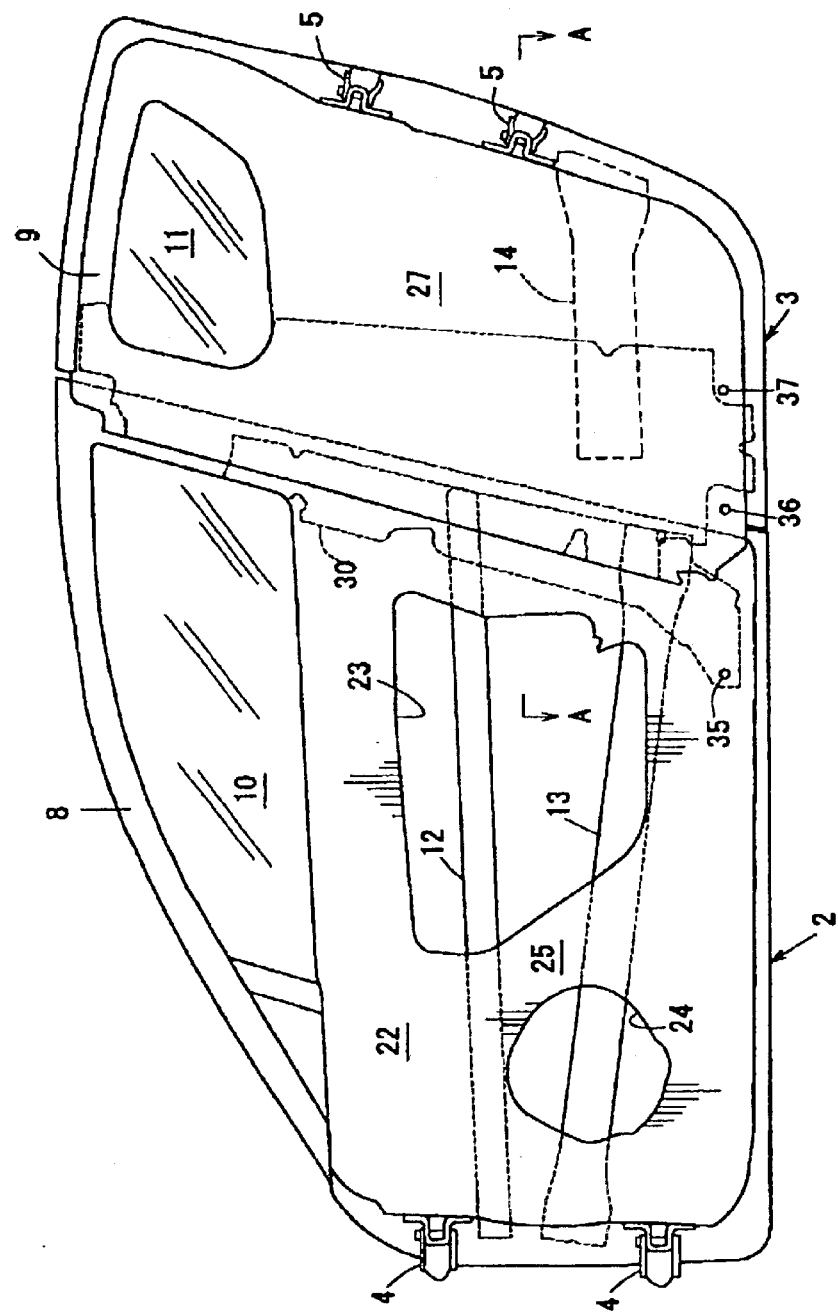
FIG. 3 is a side view of a side door, seen from the inside of a vehicle cabin.
Figure 4:
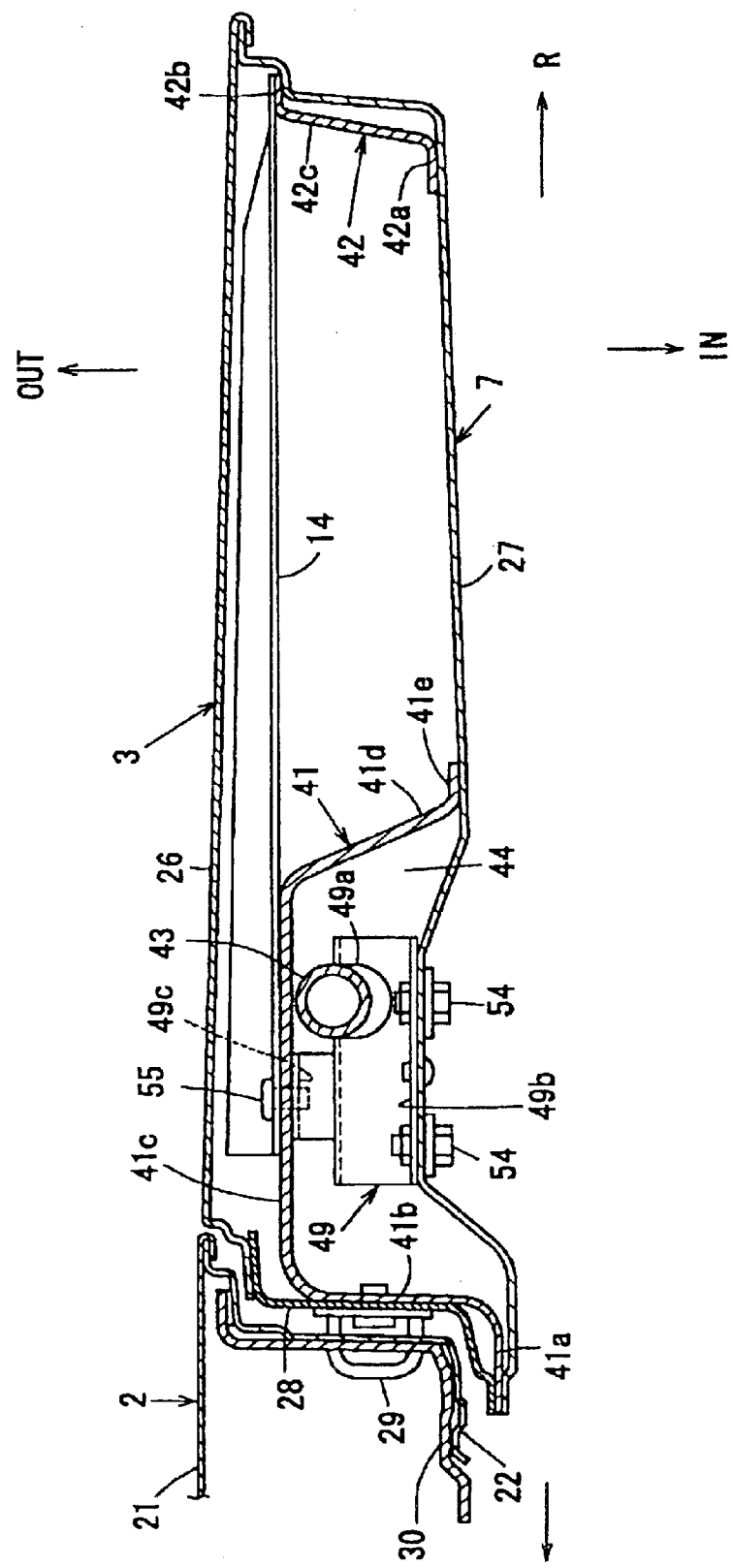
FIG. 4 is a sectional view of the side door, seen along an A—A line in FIG. 3.

FIG. 3 is a side view showing the side door on the right-hand side, seen from the inside of a vehicle cabin. FIG. 4 is a partial sectional view showing the side-door structure, seen along an A—A line in FIG. 3. When the front door 2 and the rear door 3 are close, as shown in FIG. 4, the rear part of the front door 2 overlaps over a predetermined area with the front-part outside of the rear door 3.

The front door 2 includes a door outer panel 21 and a door inner panel 22. As shown in FIG. 3, two opening portions 23, 24 (or opening portions used for attaching a door module) and a partition portion 25 are formed in the door inner panel 22. The partition portion 25 is located between the opening portions 23, 24 and extends in an oblique direction or in an inclining direction from the upper front to the lower The rear door 3 includes door outer panels 26, 28 divided into two members and a door inner panel 27. Each panel 26, 27, 28 is made of light metal or light alloy, such as aluminum or aluminum alloy. A striker 29 is attached to a predetermined part of the door outer panel 28 which configures the front-end part of the rear door 3. The striker 29 corresponds to the door latch 16 of the front door 2. Thus, a rear part of the front door 2 can be locked in a front part of the rear door 3.

Figure 5:
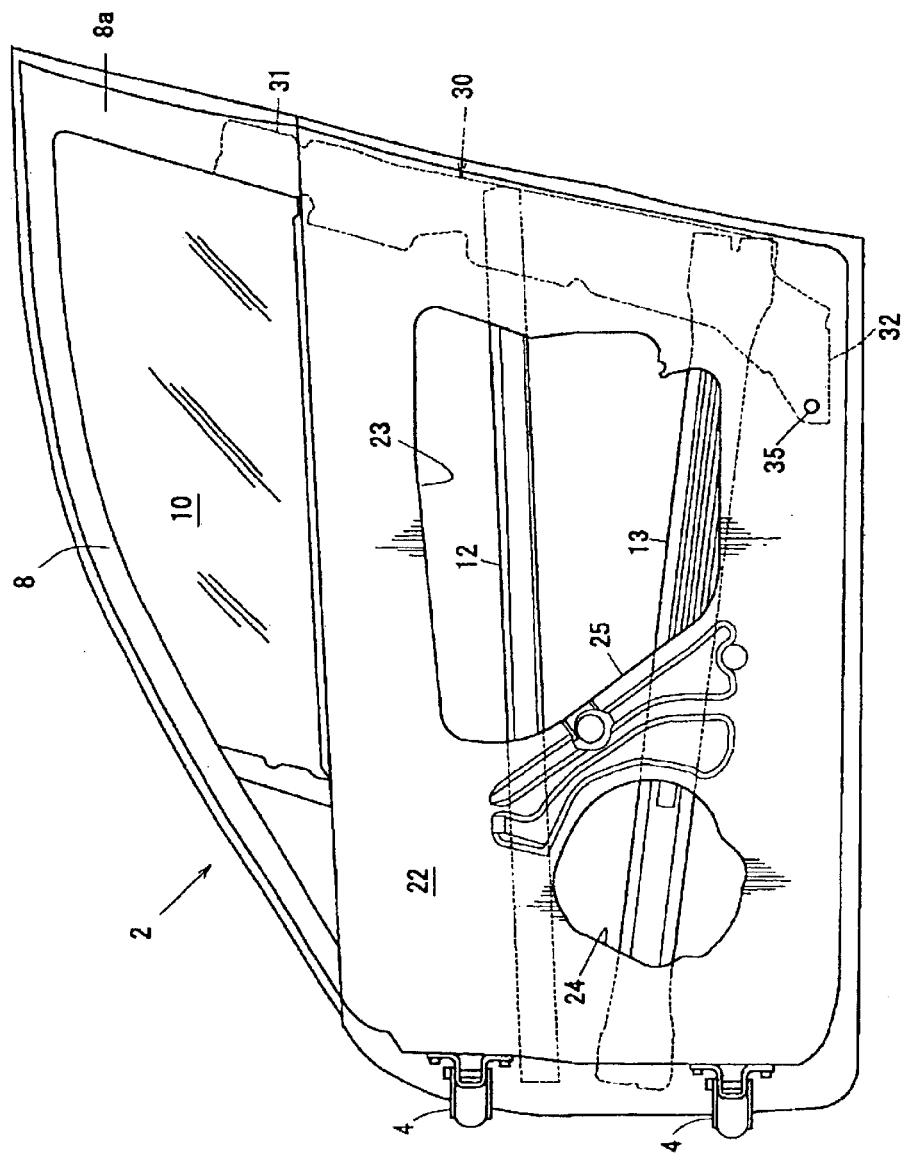
FIG. 5 is a side view of a front door.

FIG. 5 is a side view showing the front door 2 on the right-hand side, seen from the inside of the vehicle cabin. As shown in FIG. 5 and FIG. 4, a front-door rear reinforcement 30 is disposed at a rear longitudinal-side part of the front door 2. The front-door rear reinforcement 30 extends in the up-and-down directions along the rear longitudinal-side part. Herein, the front-door rear reinforcement 30 is a rigid member which allows the front door 2 to become more rigid. Thus, the rigidity becomes greater against a side bump, thereby reducing the depth to which the front door 2 makes its way into the vehicle cabin when the vehicle is bumped at its side part.

The front-door rear reinforcement 30 includes an extending-out portion 31 at its upper-end part. The extending-out portion 31 extends continuously into a rear longitudinal-side part 8a of a door sash portion 8. It makes the door sash portion 8 more rigid and also prevents seal members from being sucked out of the vehicle by negative pressure while it is running at high speed.

In addition, the front-door rear reinforcement 30 includes an extending portion 32 at its lower-end part. The extending portion 32 extends forward along the front-and-rear side at the lower part of the front door 2. It not only makes the front-door rear reinforcement 30 itself more rigid, but also makes the front-door lower part more rigid.

A catcher pin 35 is provided which protrudes convexly from the extending portion 32 toward a side-shell outer 34 (see FIG. 7) of a side shell 33 on the vehicle-body side.

The catcher pin is provided not only in the front door 2, but also in the lower part of the rear door 3, as shown in FIG. 3. Catcher pins 35, 36, 37 are each located at substantially equal intervals in the front-and-rear directions.

Figure 6:
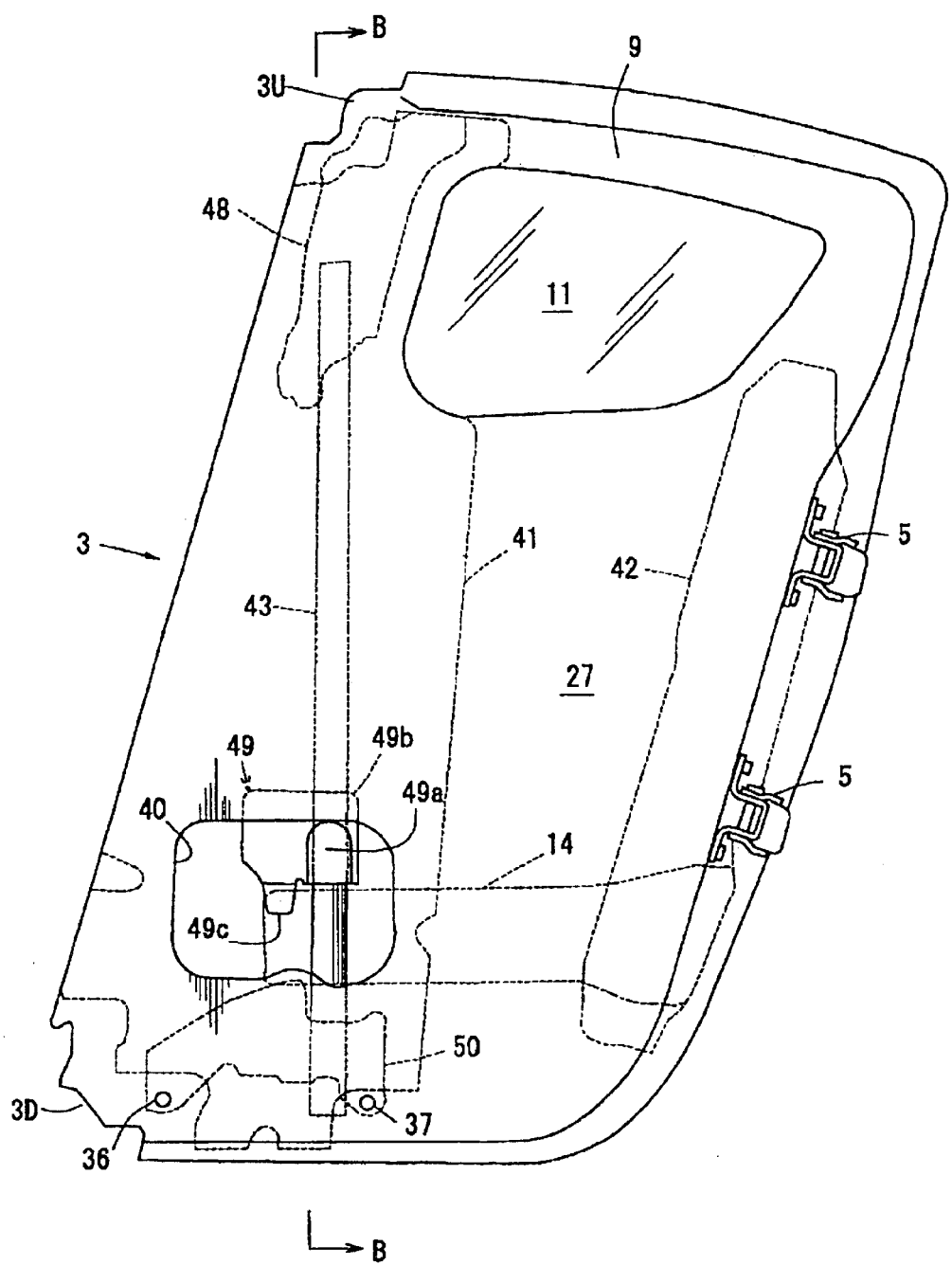
FIG. 6 is a side view of a rear door.
Figure 7:
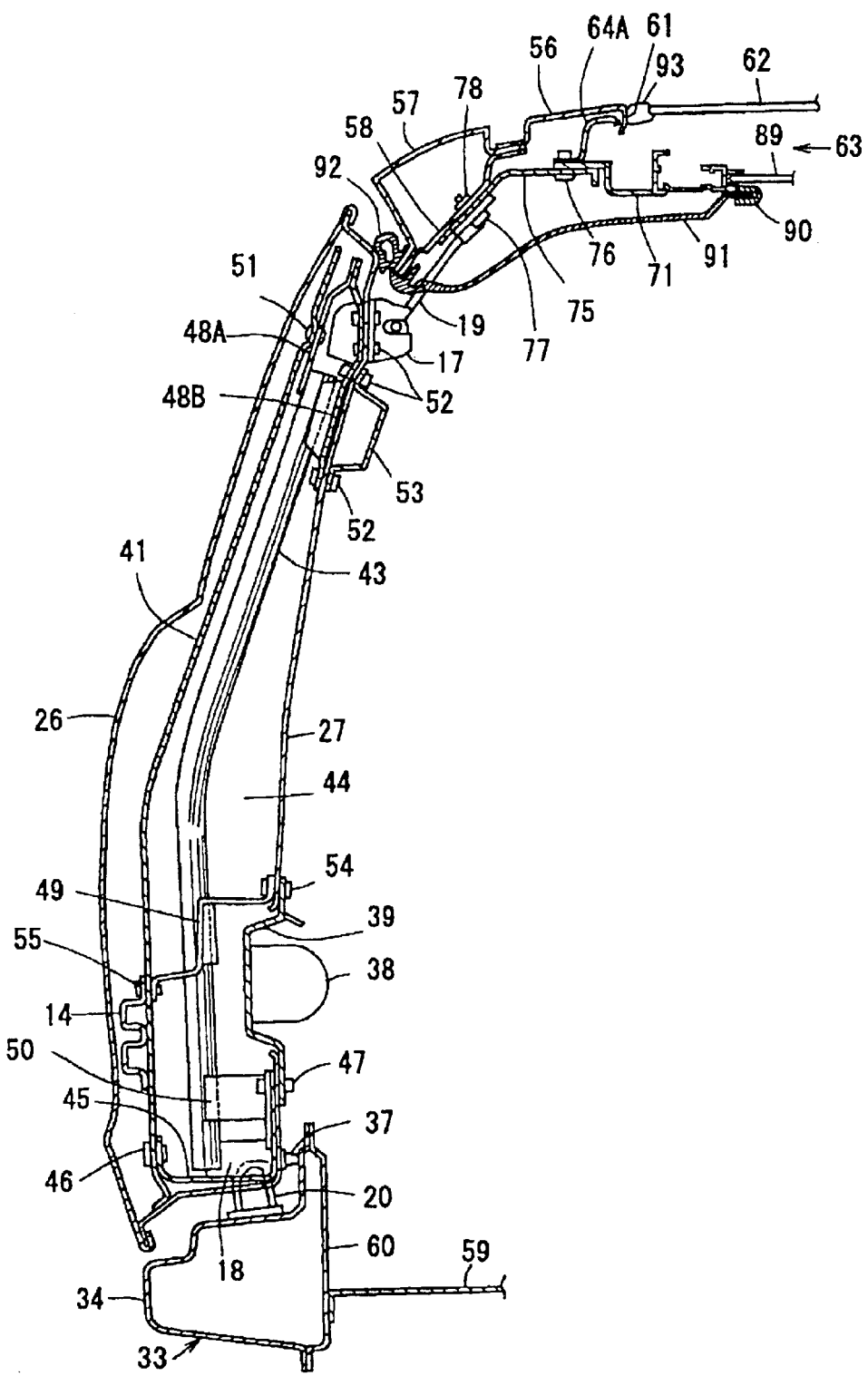
FIG. 7 is a sectional view of the rear door, seen along a B—B line in FIG. 6.

FIG. 6 is a side view showing the right-hand rear door 3, seen from the inside of the vehicle cabin. FIG. 7 is a sectional view showing the rear door 3, seen along a B—B line in FIG. 6. As shown in FIG. 6 and FIG. 7, in the lower part of the rear door 3, an opening portion 40 is formed at a predetermined part of the door inner panel 27. A bracket 39 of a seatbelt retractor 38 is attached to the opening portion 40.

As shown in FIGS. 4, 6 and 7, a vertical reinforcement 41 is provided as a reinforcement member in the front longitudinal-side part of the rear door 3. The vertical reinforcement 41 extends along the up-and-down directions over a substantially entire height of the front longitudinal-side part including the door sash portion 9 of the rear door 3.

The vertical reinforcement 41 (as a rigid member) is formed by a thick-plate member of light metal or light alloy such as aluminum or aluminum alloy. As shown in FIG. 4, it has a substantially hat-shaped cross section. Thus, the vertical reinforcement 41 includes: a front strip 41a which extends in the front-and-rear directions of the vehicle in the vehicle-inside front part; a front-plane strip 41b which extends in a vehicle-width direction from the rear end of the front strip 41a; a side-plane strip 41c which extends rearward in the front-and-rear directions of the vehicle from the outer end of the front-plane strip 41b; a rear-plane strip 41d which extends rearward in the front-and-rear directions of the vehicle and inward in the vehicle-width directions from the rear end of the side-plane strip 41c; and a rear strip 41e which extends rearward in the front-and-rear directions of the vehicle from the inner end of the rear-plane strip 41d.

The front strip 41a is sandwiched and fixed between the door inner panel 27 and the door outer panel 28. The striker 29 is attached to the part in which the front-plane strip 41b overlaps with the door outer panel 28. The rear strip 41e is joined to the middle inner-surface of the door inner panel 27 in the front-and-rear directions.

Furthermore, as shown in FIG. 4, a hinge reinforcement 42 is provided in the rear longitudinal-side part of the rear door 3. The hinge reinforcement 42 its a rigid member and extends along the up-and-down directions of the rear door 3.

The hinge reinforcement 42 is formed by a thick-plate member of light metal or light alloy such as aluminum or aluminum alloy and has a substantially Z-shaped-cross section. Thus, the hinge reinforcement 42 includes: a front strip 42a which extends in the front-and-rear directions of the vehicle on the vehicle inside; a rear strip 42b which extends in the front-and-rear directions of the vehicle on the vehicle outside; and a connecting strip 42c connecting both strips 42a, 42b which extends in the vehicle-width directions.

As shown in FIGS. 4, 6 and 7, the lateral impact bar 14 mentioned previously is joined and fixed to the side-plane strip 41c of the vertical reinforcement 41 and the rear strip 42b of the hinge reinforcement 42, between each strip or between each rigid member, such that it extends in the front-and-rear directions of the vehicle. In other words, the front-end part and the rear-end part of the lateral impact bar 14 overlap the vertical reinforcement 41 and the hinge reinforcement 42, respectively. This overlap structure allows the rear door 3 to become more rigid against a side bump.

As its cross sectional shape is shown in FIG. 7, the lateral impact bar 14 has an uneven shape which makes the lateral impact bar 14 itself more rigid.

In the rear door 3, as shown in FIG. 6, its front longitudinal-side part leans to the back. Between a front-upper edge part 3U (or a front-upper corner part) of the front longitudinal-side part and a part which is away from a front-lower edge part 3D (or a front-lower corner part) thereof, a longitudinal impact bar 43 is provided which extends substantially perpendicularly in the up-and-down directions.

This longitudinal impact bar 43 is formed by a pipe member made of high-strength steel (or a rigid pipe member).

As can be seen from the side in FIG. 6, the vertical reinforcement 41 is placed to overlap with the longitudinal impact bar 43 in the front-and-rear directions of the vehicle. More specifically, as shown in FIG. 4, a closed cross section 44 is formed between the vertical reinforcement 41 and the door inner pane 127 of the rear door main body 7. The longitudinal impact bar 43 is placed inside this closed cross section 44.

Furthermore, the lateral impact bar 14, as shown in FIG. 4 and FIG. 6, is placed to overlap at its front part with the longitudinal impact bar 43 in the front-and-rear directions of the vehicle.

Besides, as the state in which the front door 2 and the rear door 3 are closed is shown in FIG. 4, when both doors 2, 3 are closed, the front-door rear reinforcement 30 is placed to overlap with the vertical reinforcement 41 disposed in the front longitudinal-side part of the rear door 3. This overlap structure allows the overlapping part to become more rigid, reducing the depth to which the side door makes its way into the vehicle cabin at the time of a vehicle-side bump.

As shown in FIG. 7, a door latch reinforcement 45 is provided inside the lower part of the rear door 3. Herein, the door latch reinforcement 45 has a concave longitudinal section.

The door latch reinforcement 45 includes a vehicle-outside stand-up strip and a vehicle-inside stand-up strip. The vehicle-outside stand-up strip is fixed, using a rivet 46 (or an attachment member), to the lower part of the vertical reinforcement 41. On the other hand, the vehicle-inside stand-up strip is fixed, using attachment members 47 such as a bolt, a nut and a rivet, to the door inner panel 27, together with a bracket 39 and a lower-end bracket 50 (mentioned below) of the longitudinal impact bar 43.

Figure 8:
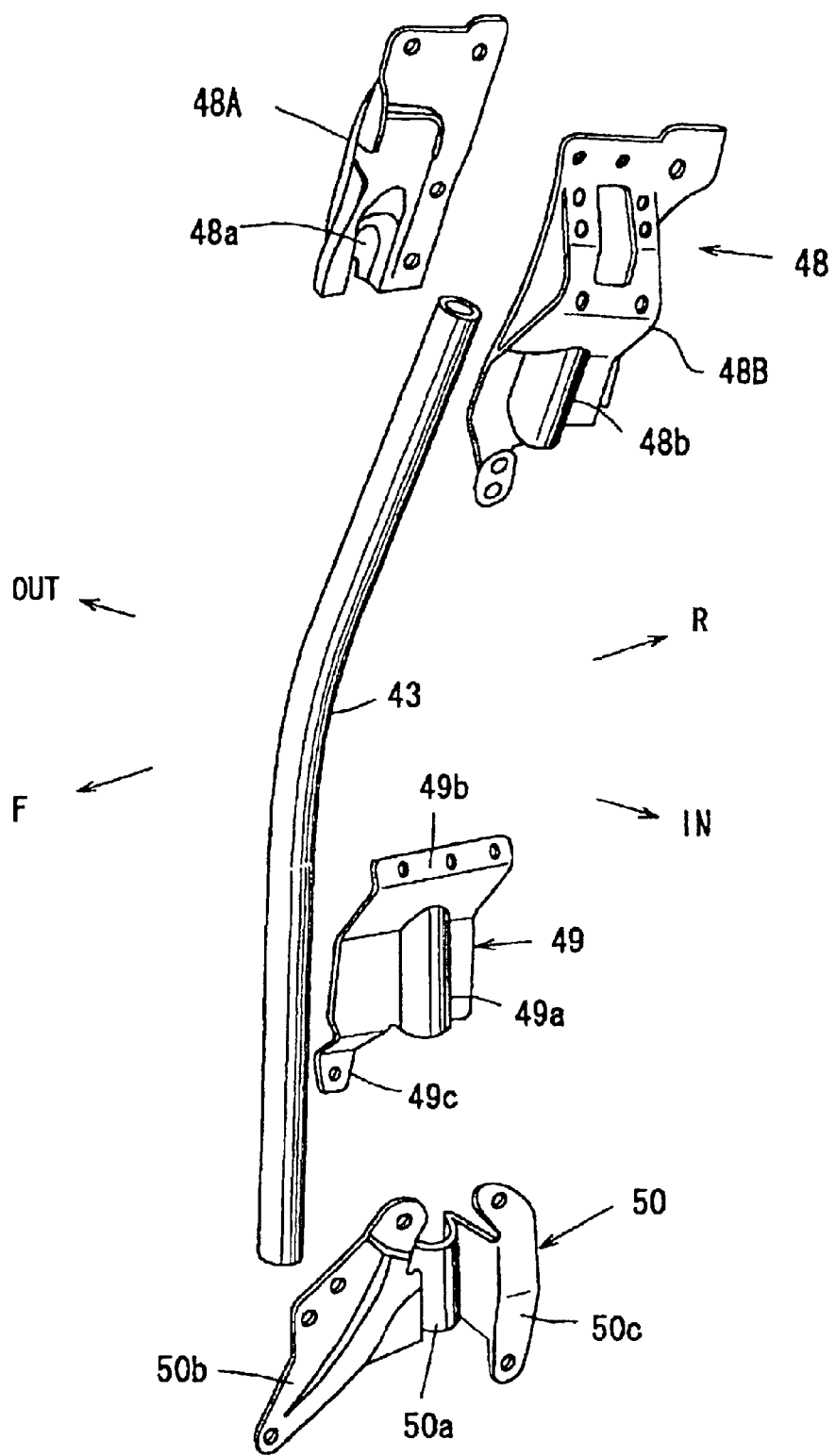
FIG. 8 is a perspective exploded view of a longitudinal impact bar and brackets.

The longitudinal impact bar 43 is fixed, as shown in FIG. 7 and FIG. 8, using an upper-end bracket 48, a middle bracket 49 and the lower-end bracket 50, to the vertical reinforcement 41 and the door inner panel 27.

Herein, the upper-end bracket 48 is configured by two members of an outer bracket 48A and an inner bracket 48B. The outer bracket 48A includes a holding portion 48a which has a substantially semicircular section. The inner bracket 48B includes a holding portion 48b which has a substantially semicircular section. Both brackets 48A, 48B are joined to hold the upper-end part of the longitudinal impact bar 43. The outer bracket 48A is fixed, using a rivet 51 (or an attachment member), to the upper part of the vertical reinforcement 41. On the other hand, the inner bracket 48B is fixed, using attachment members 52 . . . such as a bolt and a nut, to the door inner panel 27, together with the door latch 17 and an anchor bracket 53 used for a shoulder-belt anchor.

The middle bracket 49 includes: a holding portion 49a which has a substantially semicircular section; an upper-part attachment strip 49b; and a lower-part attachment strip 49c. As also shown in FIG. 4, the holding portion 49a holds a middle part of the longitudinal impact bar 43. The upper-part attachment strip 49b is fixed, using attachment members 54 such as a bolt and a nut, to the door inner panel 27, together with the bracket 39. The lower-part attachment strip 49c is fixed, using a rivet 55 (or an attachment member), to the vertical reinforcement 41 together with the lateral impact bar 14.

In other words, the middle part of the longitudinal impact bar 43 in the up-and-down directions is supported with the middle bracket 49 connected to both the vertical reinforcement 41 and the door inner panel 27. The lateral impact bar 14, the vertical reinforcement 41 and the middle bracket 49 are fixed all together, using the rivet 55.

The lower-end bracket 50 includes: a holding portion 50a which has a substantially semicircular section; and front and rear attachment strips 50b, 50c. The holding portion 50a holds a lower-end part of the longitudinal impact bar 43. the front and rear attachment strips 50b, 50c is fixed, using attachment members 47 such as a bolt, a nut and a rivet, to the door inner panel 27, together with the door latch reinforcement 45 and the bracket 39.

Herein, the upper-end bracket 48, the middle bracket 49 and the lower-end bracket 50 are welded and fixed at their predetermined part to a circumferential part of the longitudinal impact bar 43.

As shown in FIG. 7, as a locking mechanism of the rear door 3, the door latch 17 at its upper part and the door latch 18 at its lower part are attached to the upper-end and lower-end parts of the longitudinal impact bar 43, respectively. More specifically, the door latch 17 at its upper part is attached to the upper-end part of the longitudinal impact bar 43 via the inner bracket 48B, and the door latch 18 at its lower part is attached to the lower-end part of the longitudinal impact bar 43 via the lower-end bracket 50 and the door latch reinforcement 45.

In FIG. 7, a roof rail outer 57 and a roof rail inner 58 are joined to a side part of a roof panel 56 at an upper part of the vehicle-body side. The striker 19 mentioned previously is attached to the roof rail inner 58.

The side shell 33 is joined to a side part of a floor panel 59 at a lower part of the vehicle-body side. Herein, the side shell 33 is configured by a side-shell inner 60 and the side-shell outer 34. The striker 20 mentioned above is attached to a predetermined part of the side-shell outer 34. The door latches 17, 18 are engaged with these strikers 19, 20 on the vehicle-body side, respectively. Herein, the door latches 17, 18 are attached to the upper-end and lower-end parts of the longitudinal impact bar 41 of the rear door 3, respectively.

In other words, the door latch 17 is disposed at an upper part in the vicinity of a free end of the rear door 3 and functions as a door-side lock portion. Facing this door latch 17, the striker 19 is disposed, as a vehicle body-side lock portion, on the vehicle-body side. The door latch 17 and the striker 19, which can be hooked to and unhooked from each other, configure a door upper-part locking mechanism which locks the rear door 3 in the vehicle body.

The door latch 18 is disposed at a lower part in the vicinity of a free end of the rear door 3 and functions as a door-side lock portion. Facing this door latch 18, the striker 20 is disposed, as a vehicle body-side lock portion, on the side of the side shell 33. The door latch 18 and the striker 20, which can be hooked to and unhooked from each other, configure a door lower-part locking mechanism which locks the rear door 3 in the vehicle body.

As shown in FIG. 1, in the roof panel 56 configuring the roof portion, a roof opening 61 is formed through which the vehicle cabin leads to the vehicle outside. This roof opening 61 is covered with a panel-shaped roof glass 62 (including a panel made of resin) so that the roof opening 61 can be opened and closed. Herein, the roof glass 62 is used as an example of the opening and closing member.

Figure 9:
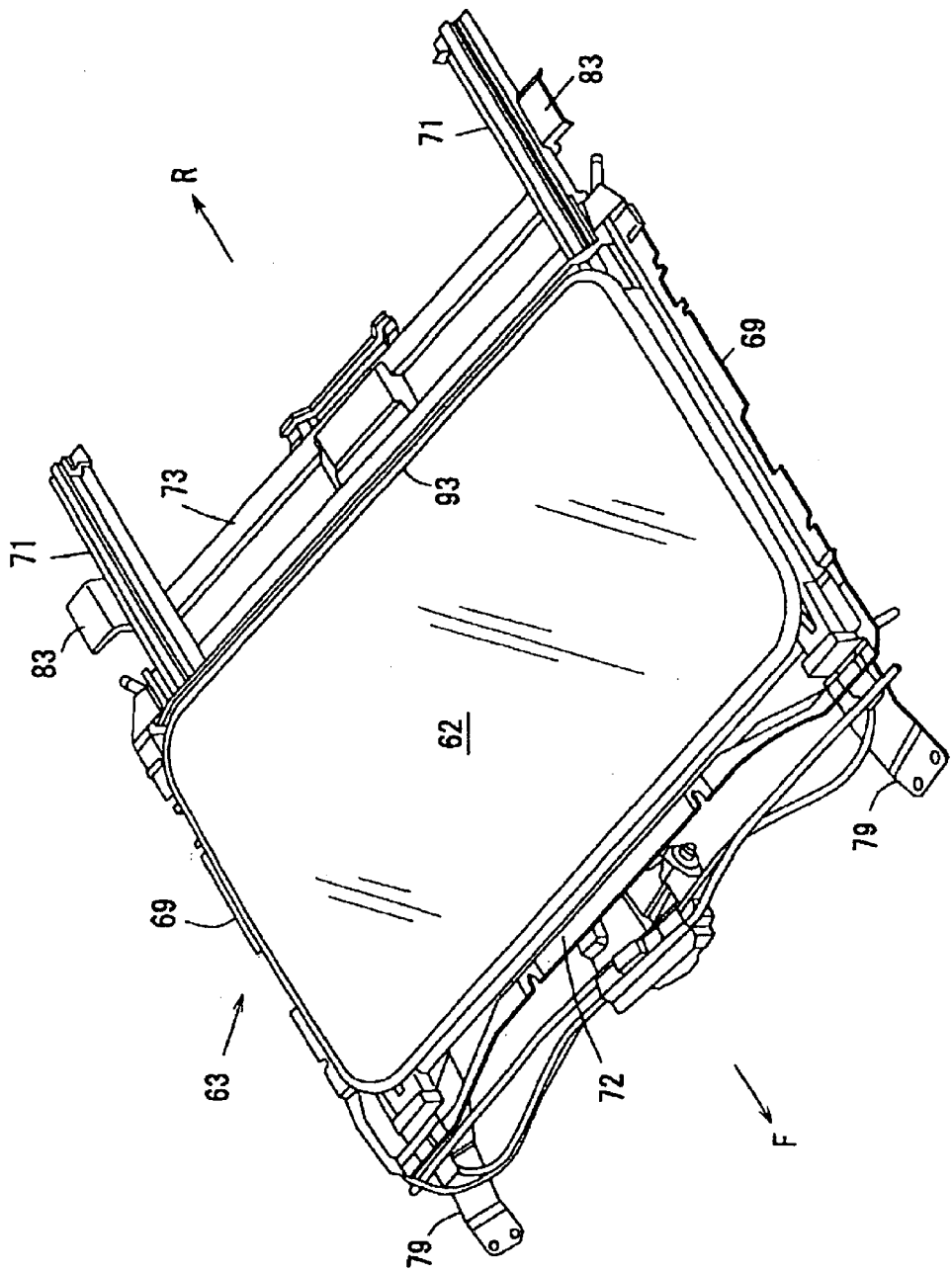
FIG. 9 is a perspective view of a sliding roof unit.

As an example of the opening frame which supports the roof glass 62, a sliding roof unit 63 is provided (see FIG. 9).

Figure 10:
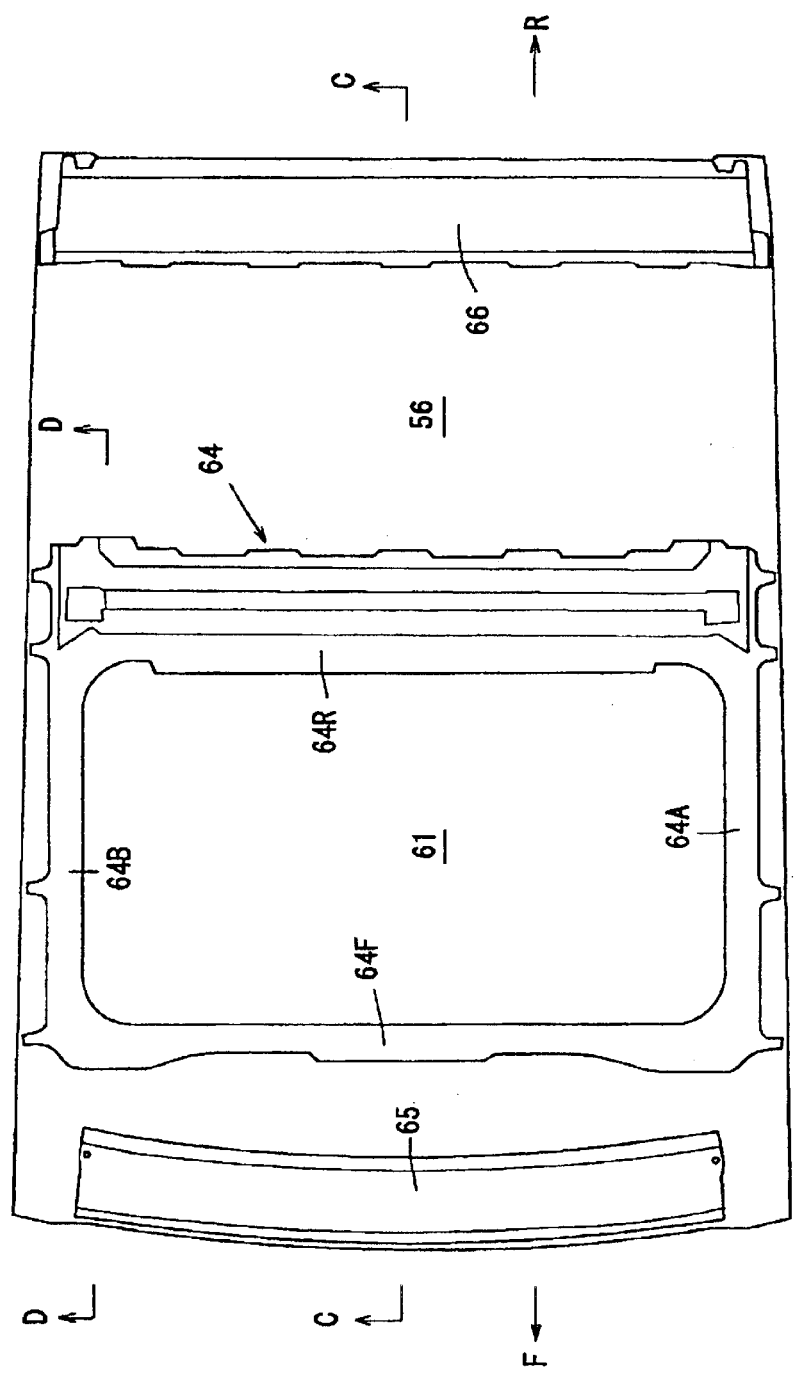
FIG. 10 is a plan view of a roof portion, seen from the inside of the vehicle cabin.
Figure 11:
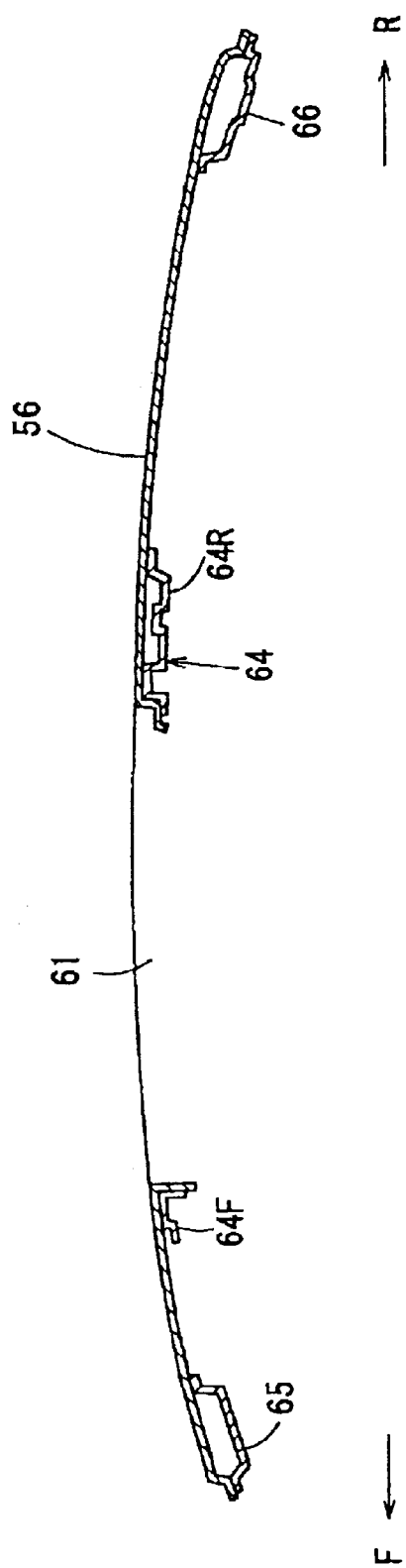
FIG. 11 is a sectional view of the roof portion, seen along a C—C line in FIG. 10.

As shown in FIG. 10 and FIG. 11, a fixing plate 64 is attached to the lower surface of the roof panel 56 so that which the sliding roof unit 63 can be connected to the roof panel 56.

FIG. 10 is a plan view of the roof portion, seen from the inside of the vehicle cabin. FIG. 11 is a sectional view of the roof portion, seen along a C—C line in FIG. 10. The above described fixing plate 64 includes a front-side portion 64F, a rear-side portion 64R, a right-side portion 64A, and a left-side portion 64B. These portions are united in the shape of a rectangular frame. The fixing plate 64 is fixed to the lower surface of the roof panel 56 at a peripheral part of the roof opening 61.

A front header 65 extending in the vehicle-width directions is joined to the lower surface at a front-end part of the roof panel 56; a rear header 66 extending in the vehicle-width directions, to the lower surface at a rear-end part thereof. Thus, between the roof panel 56 and each header 65, 66, a closed cross section is formed which extends in the vehicle-width directions.

Figure 12:
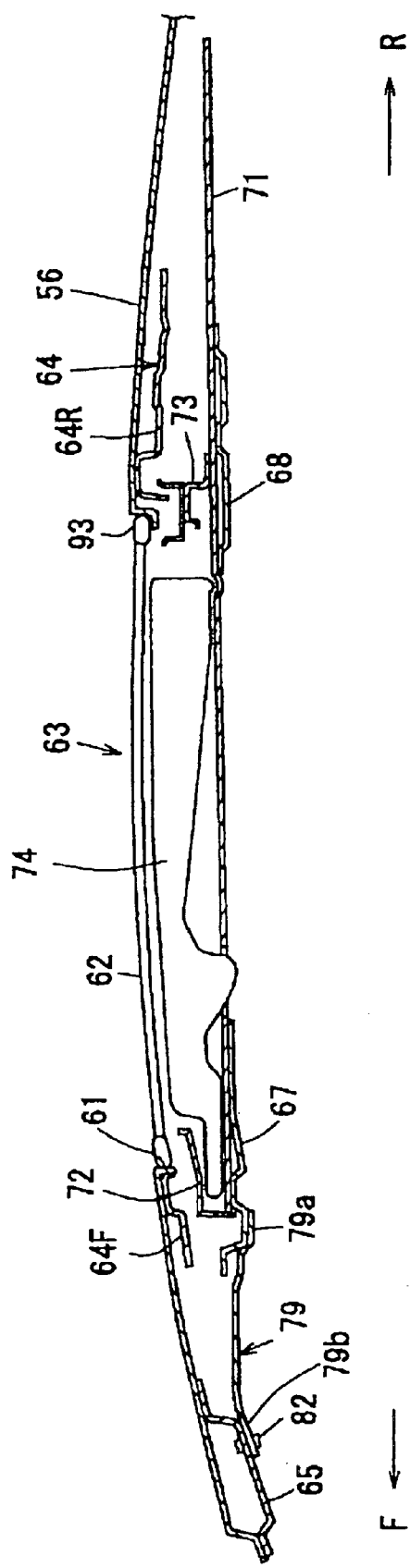
FIG. 12 is a sectional view of the roof portion, seen along a D—D line in FIG. 10.
Figure 13:
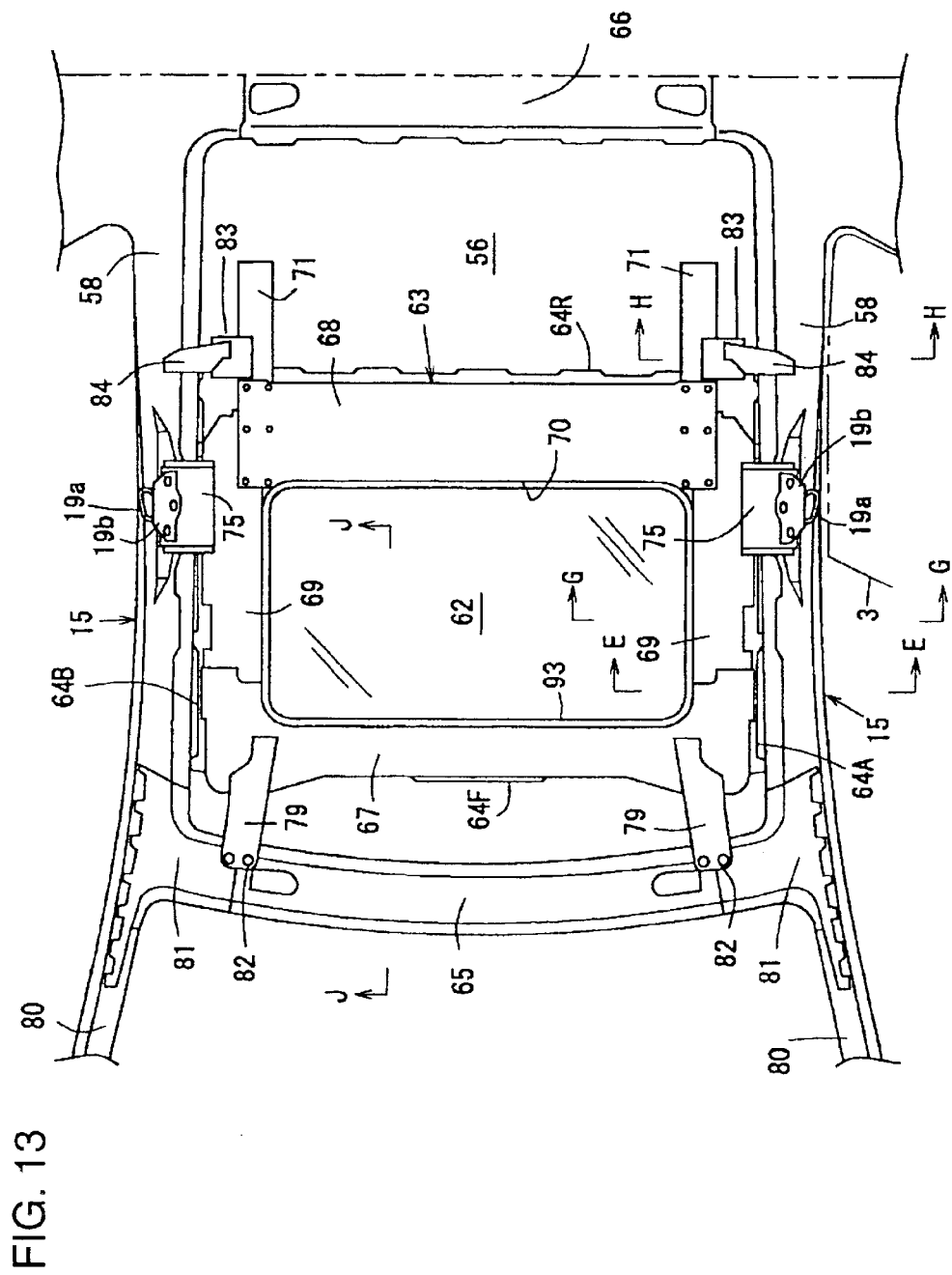
FIG. 13 is a plan view of the roof portion, seen from the inside of the vehicle cabin, showing its configuration in FIG. 12.

FIG. 12 is a sectional view of the roof portion, seen along a D—D line in FIG. 10, showing the sliding roof unit 63 being attached to the fixing plate 64. FIG. 13 is a plan view of the roof portion, seen from the inside of the vehicle cabin, showing its configuration in FIG. 12.

As shown in FIGS. 9, 12 and 13, the sliding roof unit 63 includes: a cross member 67 which is a front-side portion on the front side; a cross member 68 which is a rear-side portion on the rear side; and supporting frames 69, 69 which are side portions on the right and left sides. These four members form a substantially rectangular opening 70. Over upper parts of the supporting frames 69, 69, right and left rail portions 71, 71 are disposed which extend in the front and rear directions of the vehicle and support a supporting portion of the roof glass 62 so that the supporting portion can slide thereon.

As shown in FIG. 9 and FIG. 12, over the front and rear cross members 67, 68, front and rear upper cross members 72, 73 are united therewith, respectively. In the sliding roof unit 63, sliding mechanisms 74 are provided on both right and left sides thereof.

Figure 14:
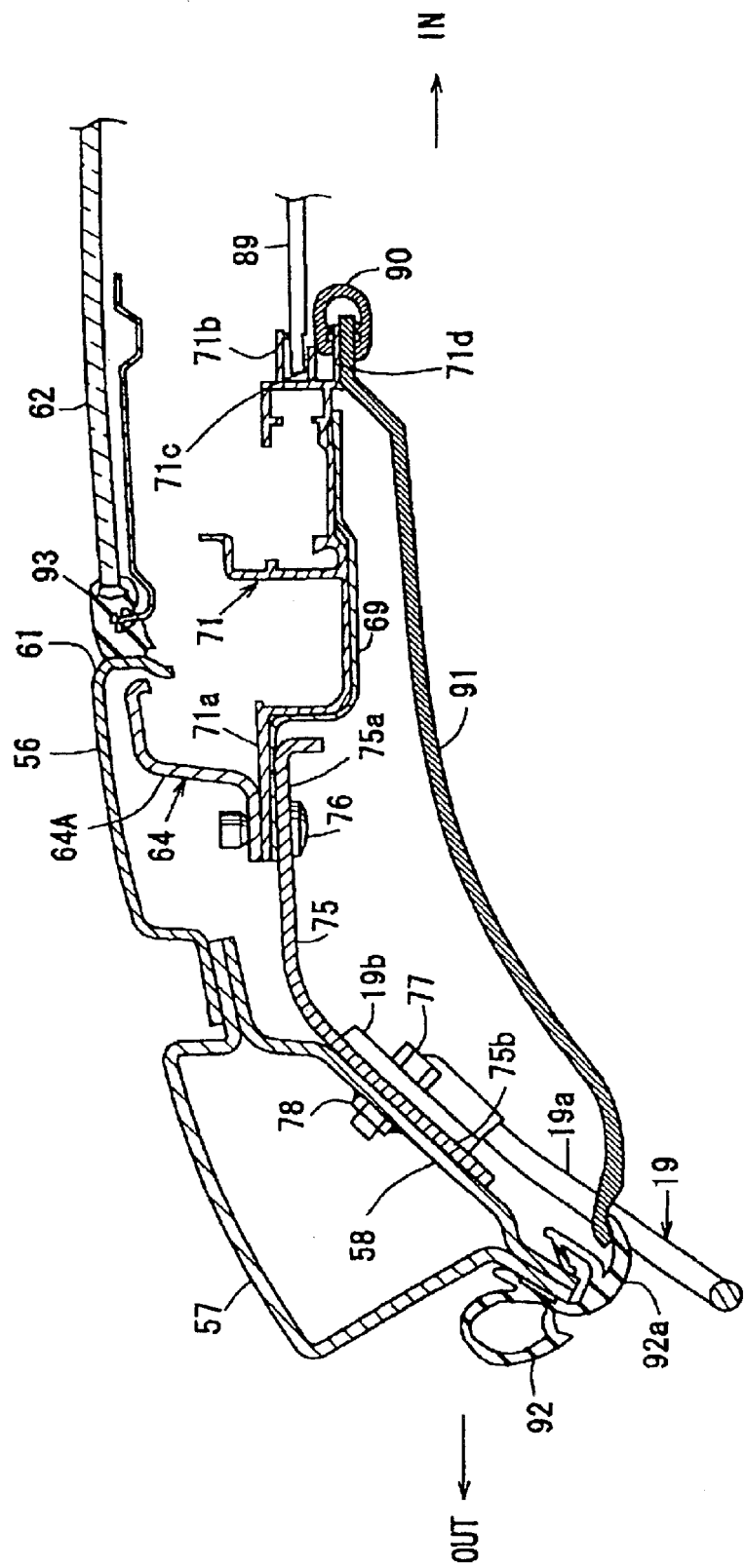
FIG. 14 is an enlarged sectional view of a main part of the rear door in FIG. 7.
Figure 15:
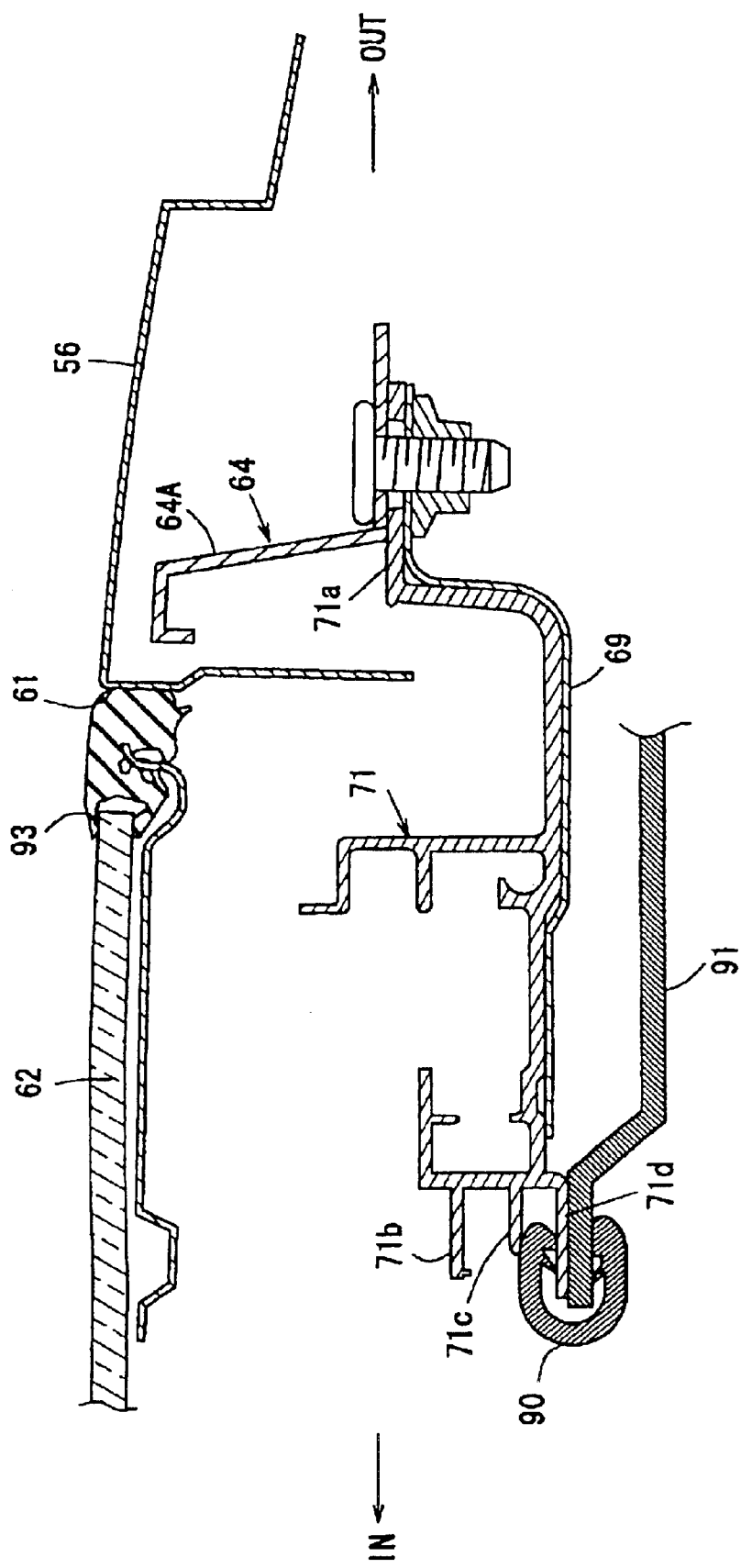
FIG. 15 is a sectional view of the roof portion, seen along an E—E line in FIG. 13.
Figure 16:
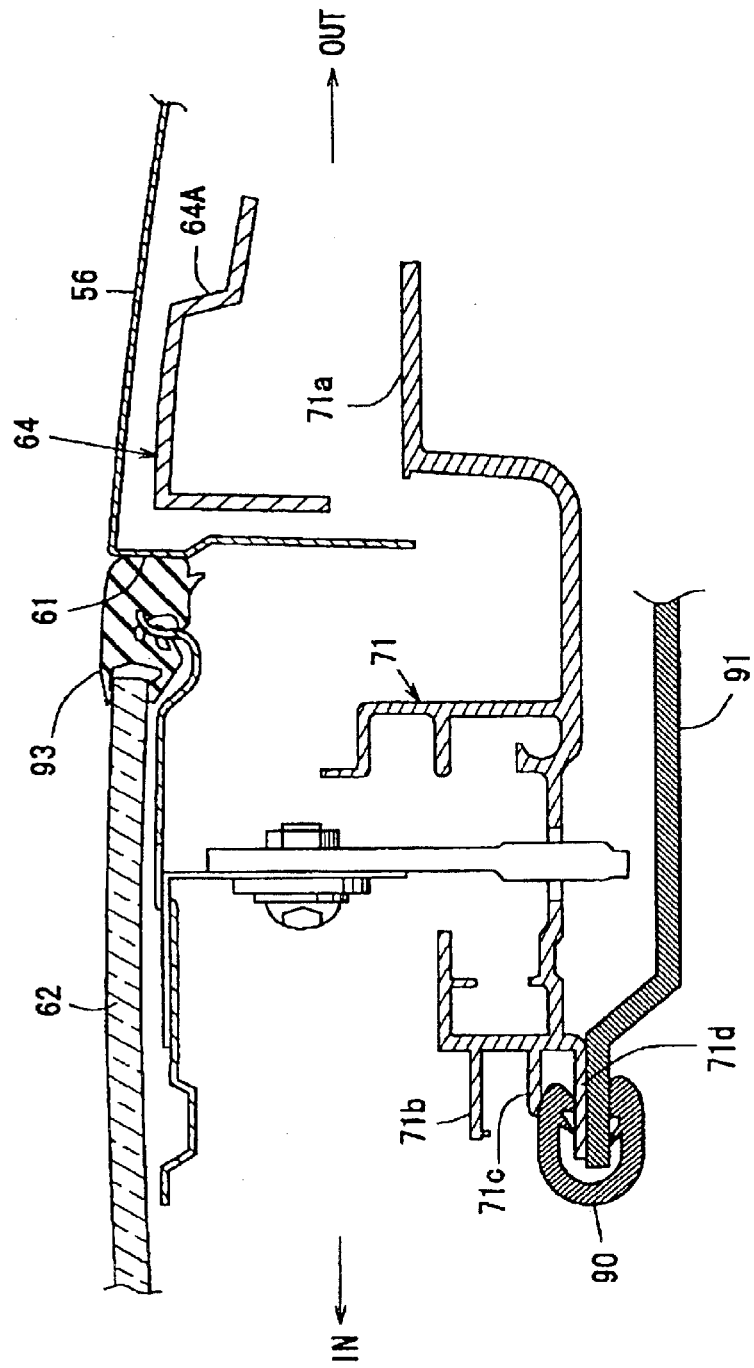
FIG. 16 is a sectional view of the roof portion, seen along a G—G line in FIG. 13.
Figure 17:
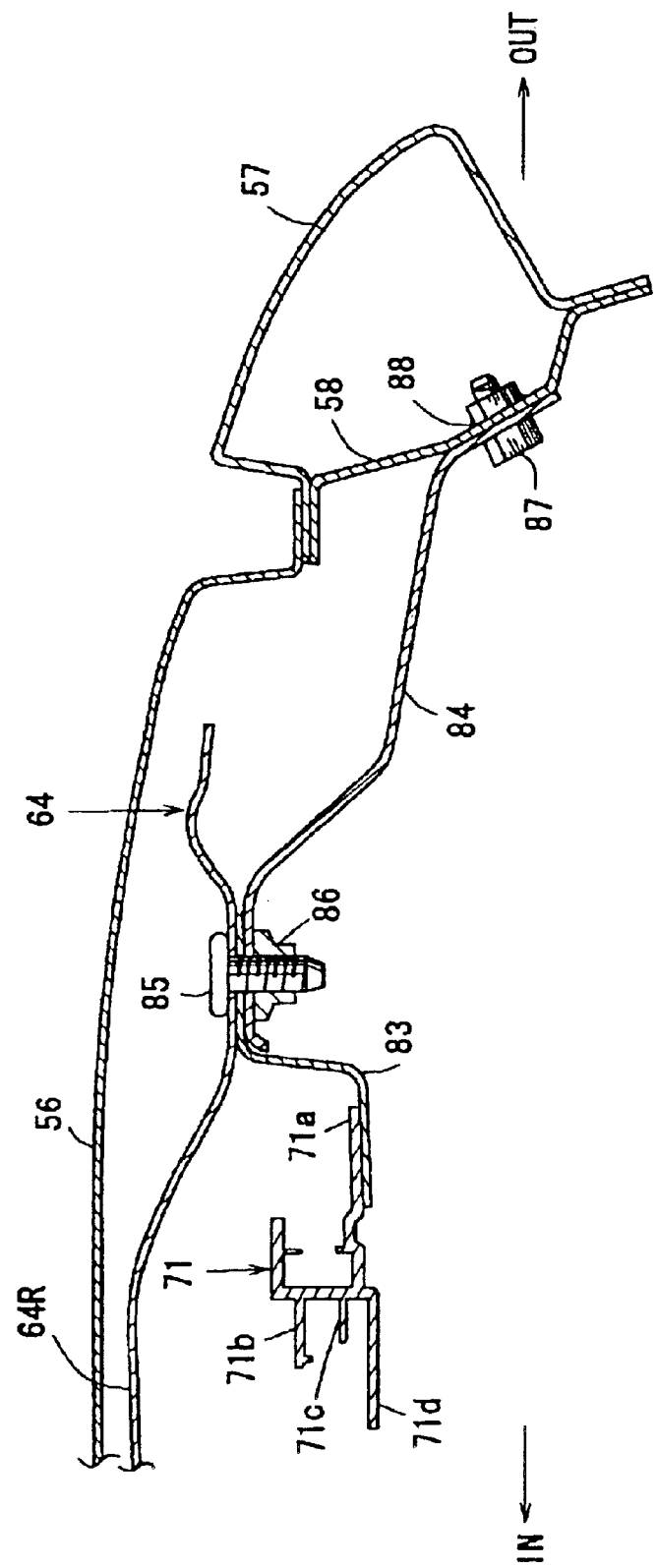
FIG. 17 is a sectional view of the roof portion, seen along an H—H line in FIG. 13.
Figure 18:
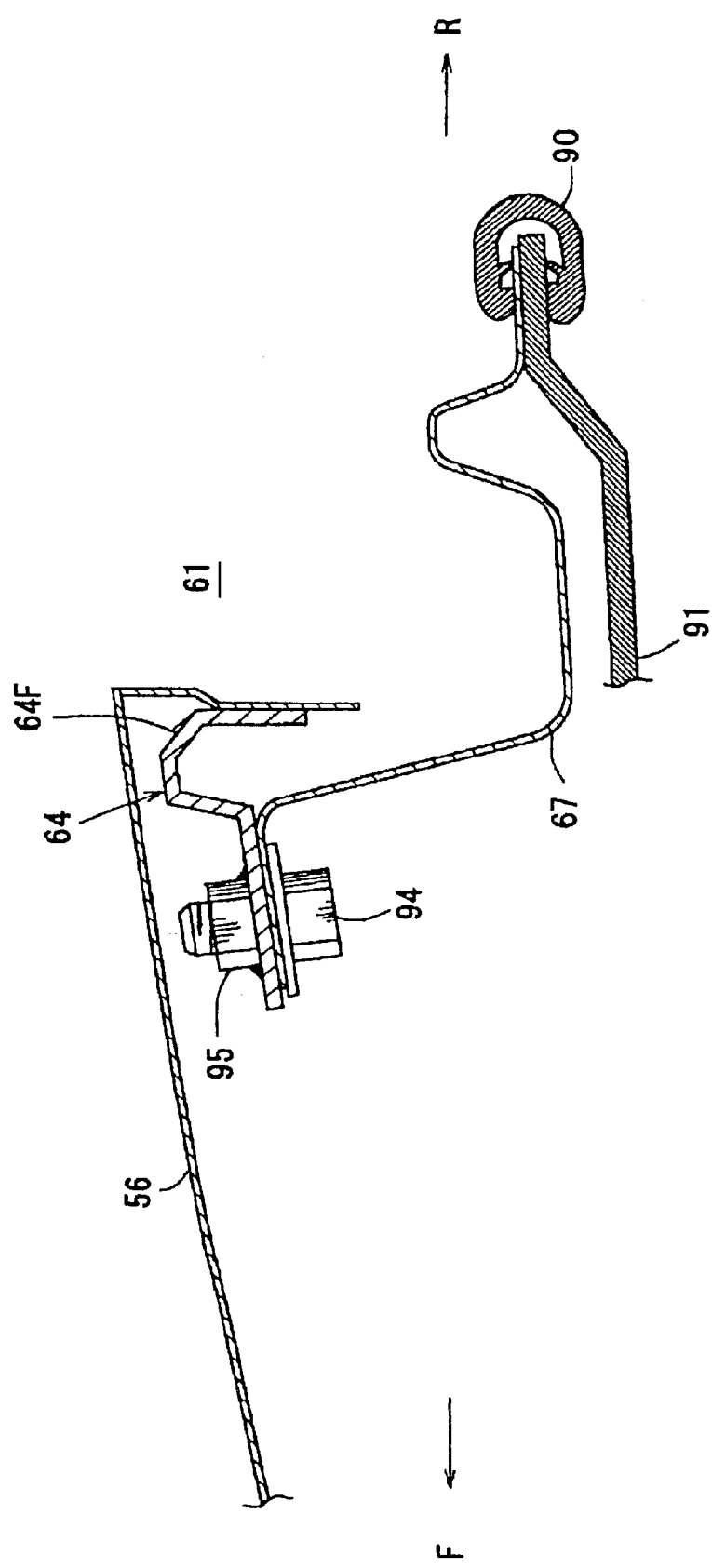
FIG. 18 is a partially sectional view of the roof portion, seen along a J—J line in FIG. 13.

FIG. 14 is an enlarged sectional view of a main part of the rear door in FIG. 7. FIG. 15 is a sectional view of the roof portion, seen along an E—E line in FIG. 13. FIG. 16 is a sectional view of the roof portion, seen along a G—G line in FIG. 13. FIG. 17 is a sectional view of the roof portion, seen along an H—H line in FIG. 13. FIG. 18 is a partially sectional view of the roof portion, seen along a J—J line in FIG. 13.

As shown in FIGS. 7, 13 and 14, in the supporting frames 69, 69 which are side portions on both right and left sides of the sliding roof unit 63, right and left load transmitting members 75, 75 are provided which transmit a load in the vehicle-width directions. These load transmitting members 75, 75 are located between the sliding roof unit 63 and a position corresponding to free-end upper parts of both doors 2, 3 which are kept closed.

As can be seen in FIG. 13, the right and left load transmitting members 75, 75 are placed, in side view, to overlap with free-end parts of both doors 2, 3 which keep the door opening portions 15 closed, in the front-and-rear directions of the vehicle. According to this embodiment, as shown in FIG. 13, the load transmitting member 75 is attached almost precisely sideways between the free-end upper part of the rear door 3 and the supporting frame 69 of the sliding roof unit 63.

As shown in FIG. 14, an upper-end portion 75a of the load transmitting member 75 is fixed, using a plurality of attachment members 76 such as a rivet, to all three members; the fixing plate 64, an extending portion 71a of the rail portion 71 and the supporting frame 69. On the other hand, a lower-end portion 75b of the load transmitting member 75 is fixed, using attachment members such as a bolt 77 and a nut 78, to the roof rail inner 58 in the vicinity of door free-end parts of both doors 2, 3 which are kept closed.

According to this embodiment, the load transmitting member 75 is configured by a gusset having a reverse-L shape. The lower-end portion 75b of the load transmitting member 75 is fixed to both of a base portion 19b of the striker 19 and the roof rail inner 58.

Figure 19:
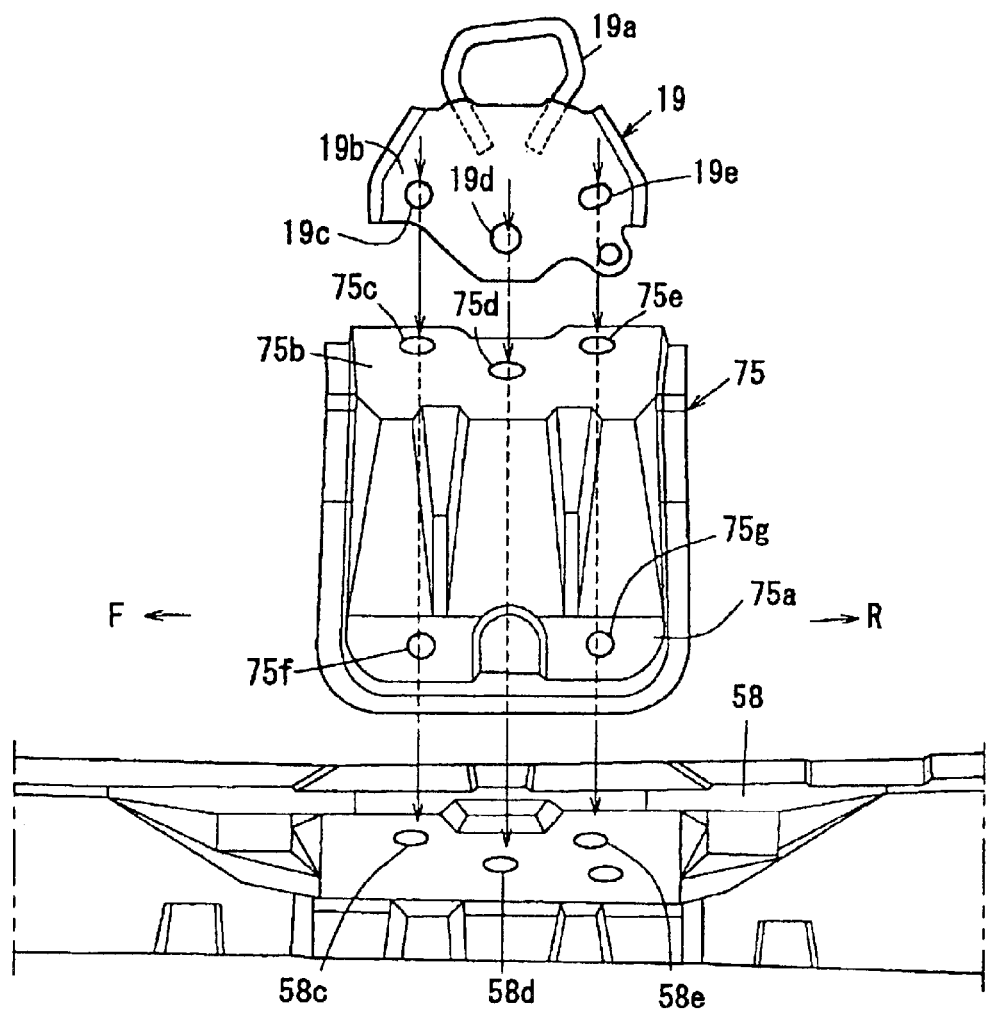
FIG. 19 is an exploded view of a striker, a load transmitting member and a roof rail inner.

As shown in an exploded view of FIG. 19, the above described striker 19 includes: the base portion 19b in which attachment holes 19c, 19d, 19e are formed; and a substantially U-shaped arm bar 19a which is united and fixed to the base portion 19b. This arm bar 19a, as shown in FIG. 7 and FIG. 14, protrudes downward.

The load transmitting member 75 includes the upper-end portion 75a and the lower-end portion 75b. In the lower-end portion 75b, attachment holes 75c, 75d, 75e are formed which correspond to the attachment holes 19c, 19d, 19e of the striker 19. In the upper-end portion 75a, on the other hand, connection holes 75f, 75g are formed which are used for the above described rivets 76.

In the roof rail inner 58, attachment holes 58c, 58d, 58e are formed which correspond to the attachment holes 19c, 19d, 19e on the side of the striker 19 and the attachment holes 75c, 75d, 75e on the side of the load transmitting member 75.

As shown in FIG. 14 and FIG. 19, the bolts 77 . . . are tightened in the nuts 78 which are welded and fixed beforehand to the roof rail inner 58 on its closed cross-section side, through the attachment holes 19c, 75c, 58c, 19d, 75d, 58d, 19e, 75e, 58e which correspond to each bolt 77 . . . , respectively. Thereby, the roof rail inner 58 and the striker 19, and the load transmitting member 75, are all fixed together. This means that the load transmitting member 75 is connected to the striker 19 used as the vehicle body-side lock portion of the door upper-part locking mechanism.

As shown in FIG. 1, when both doors 2, 3 are kept closed, the load transmitting member 75 is connected to the roof rail inner 58 such that it overlaps, in side view, with an upper part of the longitudinal impact bar 43 used as a reinforcement, in the front and rear directions of the vehicle.

As shown in FIG. 12 and FIG. 13, the sliding roof unit 63 is disposed at a predetermined distance from the front header 65 in the front and rear directions of the vehicle. The front cross member 67 which corresponds to the front-end part of the sliding roof unit 63 is connected at its right and left parts to the front header 65 by means of right and left connection members 79, 79.

According to this embodiment, as shown in FIG. 13, the connection members 79, 79 are disposed on extension lines of the right and left rail portions 71, 71 in the sliding roof unit 63.

Figure 20:
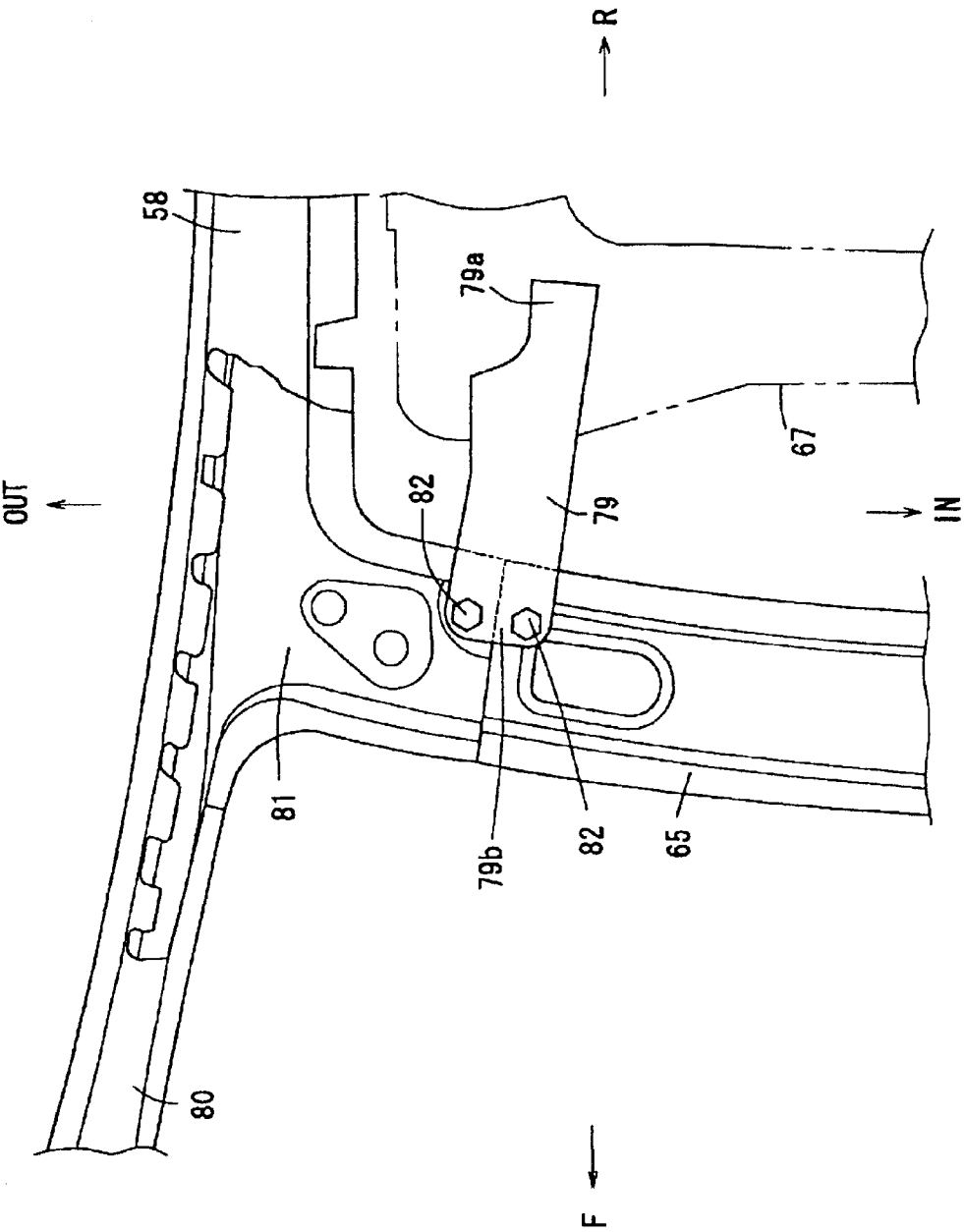
FIG. 20 is an enlarged view of a main part of the roof portion in FIG. 13.

FIG. 20 is an enlarged view of a main part of the roof portion in FIG. 13. As shown in FIG. 20, on the inside of the vehicle cabin between: a front pillar inner 80 and the front header 65; and the roof rail inner 58, a front pillar reinforcement 81 is provided which has a substantially T-shape. A rear-end portion 79a of the above described connection member 79 is connected, by means of a connecting means such as welding, to the cross member 67 of the sliding roof unit 63, on an extension line of the rail portion 71. On the other hand, a front-end portion 79b of the connection member 79 is connected, by means of a connecting member 82, 82 such as a bolt and a nut, astride to both the front header 65 and the front pillar reinforcement 81.

As shown in FIG. 13, the rear cross member 68 forms, as the rear-side part, the substantially rectangular opening 70 of the sliding roof unit 63. This rear cross member 68, as shown in this figure, is located behind the front-end part of the load transmitting member 75 and overlaps forward with the rear-end part of the load transmitting member 75.

As shown in FIG. 13 and FIG. 17, an attachment bracket 83 which has a substantially Z-shaped-cross-section is attached to the rail portion 71 which is located right behind the rear cross member 68. Between the end part of this attachment bracket 83 on the outside of the vehicle and the roof rail inner 58, there is a connection gusset 84 which is attached thereto.

This connection gusset 84, as shown in FIG. 17, is fixed at its end part on the inside of the vehicle, by means of an attachment member such as a bolt 85 and a nut 86, to both of the fixing plate 64 and the attachment bracket 83. At its end part on the outside of the vehicle, the connection gusset 84 is fixed, as shown in the same figure, by means of an attachment member such as a bolt 87 and a nut 88, to the roof rail inner 58.

The above described rail portion 71, as shown in FIGS. 14, 15, 16 and 17, includes: an extending portion 71a on the outside of the vehicle; and three guide strips 71b, 71c, 71d which protrude substantially horizontally from its inner-end part toward the inside of the roof opening 61 and extend in parallel with each other in the front-and-rear directions. As shown in FIG. 14, a sunshade 89 is disposed in a concave portion between the upper guide strip 71b and the middle guide strip 71c.

To the lower guide strip 71d, an inner-end part of a top sealing 91 is fixed, using a molding member 90. An outer-end part of this top sealing 91, as shown in FIG. 14, is fixed to a lip portion 92a of a weather strip 92 which is attached to the part where the roof rail outer 57 and the roof rail inner 58 are joined on their downside.

In this figure, reference numeral 93 denotes a sealing member which is disposed at a peripheral part of the roof glass 62. In FIG. 18, reference numerals 94, 95 denote attachment members such as a bolt and a nut which are used to connect the cross member 67 and the fixing plate 64. The aforementioned description has been provided mainly of the side door structure and the vehicle-body structure on the right-hand side. However, the structures on the left-hand side are configured such that they are substantially symmetrical with those on the right-hand side. In the drawings, reference character F designates the front of the vehicle; R, the rear of the vehicle; IN, the inside of the vehicle; OUT, the outside of the vehicle.

The vehicle upper body structure according to the aforementioned embodiment, in which a front door 2 and a rear door 3 cover a continuous door opening 15 with no partition in a side part of a vehicle body so that the door opening portion 15 is opened and closed, the front door 2 is pivotally attached at a front part thereof to the vehicle body so that the front door 2 is opened and closed, and the rear door 3 is pivotally attached at a rear part thereof to the vehicle body so that the rear door 3 is opened and closed, comprises: a roof opening 61 which is formed in a roof portion of the vehicle body and through which a vehicle cabin leads to the outside of a vehicle; an opening and closing member (refer to the roof glass 62) which covers the roof opening 61 so that the roof opening 61 is opened and closed; a roof opening frame (refer to the cross members 67, 68 and the supporting frames 69 which are used as the frames of the sliding roof unit 63) which supports the opening and closing member (refer to the roof glass 62); and a load transmitting member 75 which transmits a load given in the vehicle-width directions, the load transmitting member 75 being disposed at a side part (refer to the supporting frame 69) of the roof opening frame such that the load transmitting member 75 is located between the roof opening frame and a position corresponding to free-end upper parts of both doors 2, 3 which are kept closed.

According to this configuration, the load transmitting member 75 disperses a load (i.e., a load given from the outside to the inside of the vehicle-width directions) at the time when the doors are kept closed, by bearing the load and transmitting it to the roof opening frame (refer to each component 67, 68, 69), and thereby, the vehicle body of a non-center pillar vehicle with a roof opening 61 becomes more rigid. This is advantageous to the vehicle, even when it is bumped at its side part.

Furthermore, the load transmitting member 75, in side view, overlaps with free-end parts of both doors 2, 3 which keep the door opening portion 15 closed, in the front and rear directions of the vehicle.

According to this configuration, the load transmitting member 75 overlaps with free-end upper parts of the doors in the front and rear directions of the vehicle. This makes it easy to transmit a load at the time when the doors are closed to the roof opening frame (refer to the frames of the sliding roof unit 63), allowing the load to disperse more effectively.

Furthermore, the load transmitting member 75 is connected at one end thereof to the roof opening frame (refer to the frames of the sliding roof unit 63), and is connected at the other end thereof to a roof rail (refer to the roof rail inner 58) in the vicinity of free-end parts of both doors 2, 3 which are kept closed.

According to this configuration, the roof opening frame (refer to the frames of the sliding roof unit 63) and the roof rail (refer to the roof rail inner 58) are joined together by the load transmitting member 75. This enables the roof opening frame (refer to the frames of the sliding roof unit 63) to bear a load given in the vehicle-width directions, regardless of its direction, outward or inward, thereby making the vehicle body more rigid.

Furthermore, a reinforcement (refer to the longitudinal impact bar 43) extends in substantially the up and down directions in the vicinity of a free-end part of at least one (which corresponds to the rear door 3, according to this embodiment) of both doors 2, 3; and the load transmitting member 75 is connected to a roof rail (refer to the roof rail inner 58) so as to overlap, in side view, with an upper part of the reinforcement (refer to the vertical reinforcement 41) in the front and rear directions of the vehicle while both doors 2, 3 are kept closed.

According to this configuration, the reinforcement (refer to the longitudinal impact bar 43) is provided which reinforces the vicinity of a free-end part of the rear door 3. This makes it possible for the rear door 3 to bear, more sufficiently, a load given in the vehicle-width directions, thereby making the vehicle body more rigid, especially against a side bump.

Furthermore, a door-side lock portion (refer to the door latch 17) is disposed at an upper part in the vicinity of a free end of at least one (which corresponds to the rear door 3, according to this embodiment) of both doors 2, 3, a vehicle body-side lock portion (refer to the striker 19) is disposed in a position where a roof rail (refer to the roof rail inner 58) faces the door-side lock portion (refer to the door latch 17) when the rear door 3 is closed, and the door-side lock portion (refer to the door latch 17) and the vehicle body-side lock portion (refer to the striker 19) are locked and unlocked; a door upper-part locking mechanism is provided which locks the rear door 3 in the vehicle body; and the load transmitting member 75 is connected to the vehicle body-side lock portion (refer to the striker 19) of the door upper-part locking mechanism.

According to this configuration, the load transmitting member 75 is connected to the vehicle body-side lock portion (refer to the striker 19) of the door upper-part locking mechanism. This allows a load at the time when the rear door 3 is kept closed to be efficiently transmitted to the roof opening frame (refer to the frames of the sliding roof unit 63), thereby making the vehicle body more rigid. In addition, a better feeling of rigidity can be given to the rear door 3 while being kept closed.

Furthermore, the reinforcement (refer to the longitudinal impact bar 43) is connected at an upper part thereof to the door-side lock portion (refer to the door latch 17).

According to this configuration, the reinforcement (refer to the longitudinal impact bar 43) and the load transmitting member 75 are locked together when the rear door 3 is kept closed. This allows a load to be transmitted more smoothly, thereby making the vehicle body more rigid.

Furthermore, the door upper-part locking mechanism includes a striker 19 which is provided in the roof rail (refer to the roof rail inner 58) and has an arm bar 19a protruding downward, and a door latch 17 which is disposed at a free end-side upper part of the rear door 3, and latches and unlatches the arm bar 19a of the striker 19; and as the load transmitting member 75, a gusset is used which is connected at one end thereof to the striker 19 and is connected at the other end thereof to the roof opening frame (refer to the frames of the sliding roof unit 63).

According to this configuration, only the gusset (refer to the load transmitting member 75) may be used in a vehicle which has no roof opening 61, and thus, the door latch 17 and the striker 19 may be replaced with a single common component. This allows vehicle designs to be drawn more freely and also allows production costs to become lower.

Furthermore, the striker 19 and one end of the gusset (refer to the load transmitting member 75) are fixed together to the roof rail (refer to the roof rail inner 58).

According to this configuration, there is no need to make any changes in the vehicle body and the striker 19 so that they can be connected to the gusset (refer to the load transmitting member 75). This allows production costs to become lower.

Furthermore, a door lower-part locking mechanism is provided which locks a free-end lower part of the rear door 3 in a side shell 33.

According to this configuration, free-end upper and lower parts of the rear door 3 are locked at both upper and lower edge parts of the door opening portion 15, respectively.

Thereby, the rear door 3 unites with the roof opening frame (refer to the frames of the sliding roof unit 63) and the side shell 33 while the rear door 3 is kept closed. As a result, the vehicle body becomes more rigid, particularly against torsion, allowing vehicle occupants to be kept safer when the vehicle is bumped at its side part.

Furthermore, the door lower-part locking mechanism is connected to a lower part of a reinforcement (refer to the longitudinal impact bar 43).

According to this configuration, the vehicle body becomes more rigid, especially against a side bump.

Furthermore, the load transmitting member 75 is provided between a free-end upper part of the rear door 3 and the roof opening frame (refer to the frames of the sliding roof unit 63); and a locking mechanism (refer to the striker 29) is provided which locks a rear part of the front door 2 at a front part of the rear door 3.

According to this configuration, the roof opening frame (refer to the frames of the sliding roof unit 63) can be put in a desirable position for occupants. In addition, the position in which the opening and closing member is put can be selected more freely, with the vehicle body being kept rigid.

Furthermore, the roof opening frame (refer to the frames of the sliding roof unit 63) is disposed at a predetermined distance from a front header 65 in the front and rear directions; and the roof opening frame is connected at a front-end part thereof to the front header 65 by means of a connection member 79.

According to this configuration, the space where a driving means (refer to a motor or a handle) which drives the opening and closing member (refer to the roof glass 62) is placed can be secured between the roof opening frame (refer to the frames of the sliding roof unit 63) and the front header 65. In addition, a load can also be transmitted to the front header 65, thereby making the vehicle body more rigid.

Furthermore, the roof opening frame (refer to the frames of the sliding roof unit 63) includes rail portions 71 on both sides, the rail portion 71 extending in the front and rear directions of the vehicle and supporting a supporting portion of the opening and closing member (refer to the roof glass 62) so that the supporting portion slides on the rail portion 71; and the connection member 79 is disposed on an extension line of the rail portion 71 in the roof opening frame.

According to this configuration, a load can be transmitted and dispersed from the rail portion 71, which has a great rigidity, of the roof opening frame (refer to the frames of the sliding roof unit 63) to the front header 65, through the connection member 79. This allows the vehicle body to become more rigid.

Furthermore, the connection member 79 is connected at the other end thereof astride to the front header 65 of the vehicle body and a roof-portion component member (refer to the front pillar reinforcement 81) which is adjacent to an end part in the vehicle-width directions of the front header 65.

According to this configuration, a load transmitted to the front header 65 can be further transmitted to a roof panel of the roof portion. This promotes further dispersion of the load, allowing the vehicle body to become more rigid.

Furthermore, the roof opening frame (refer to the frames of the sliding roof unit 63) includes front and rear-side parts and vehicle-width direction-side parts which form a substantially rectangular opening 70; and the rear-side part (refer to the cross member 68) of the opening 70 is located behind the front-end part of the load transmitting member 75 and overlaps forward with the rear-end part of the load transmitting member 75.

According to this configuration, the overlap structure allows a load given in the vehicle-width directions to be transmitted to the whole roof opening frame (refer to the frames of the sliding roof unit 63), through the load transmitting member 75. This promotes further dispersion of the load, allowing the vehicle body to become more rigid.

Figure 21:
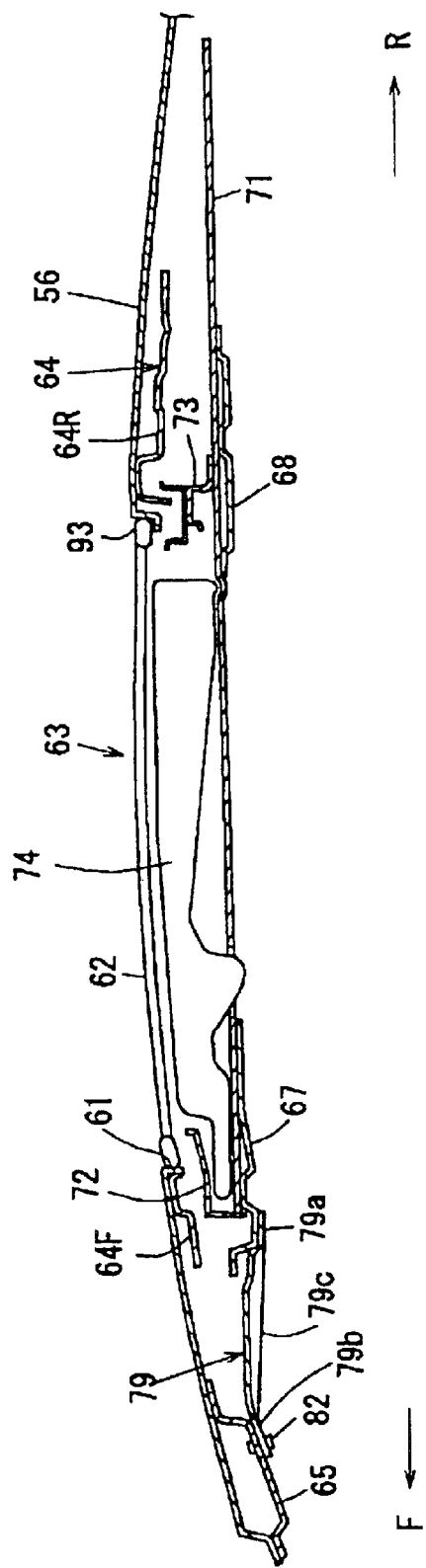
FIG. 21 is a sectional view of a roof portion of a vehicle upper body structure according to another embodiment of the present invention.

FIG. 21 is a sectional view of a roof portion of a vehicle upper body structure according to another embodiment of the present invention. According to this embodiment, in the connection member 79 which connects the front header 65 and the front cross member 67 of the sliding roof unit 63, a rib 79c is provided with being united with the connection member 79. This rib 79c extends along the long-side directions of the connection member 79 and protrudes toward the inside of the vehicle cabin. It makes the connection member 79 more rigid and also allows a load to be more efficiently transmitted.

Despite this configuration, other configuration, operation and advantages are almost the same as those according to the embodiment mentioned previously. Therefore, in FIG. 21, the same reference numerals and characters are used as those in the previous figures, and their detailed description is omitted.

Figure 22:
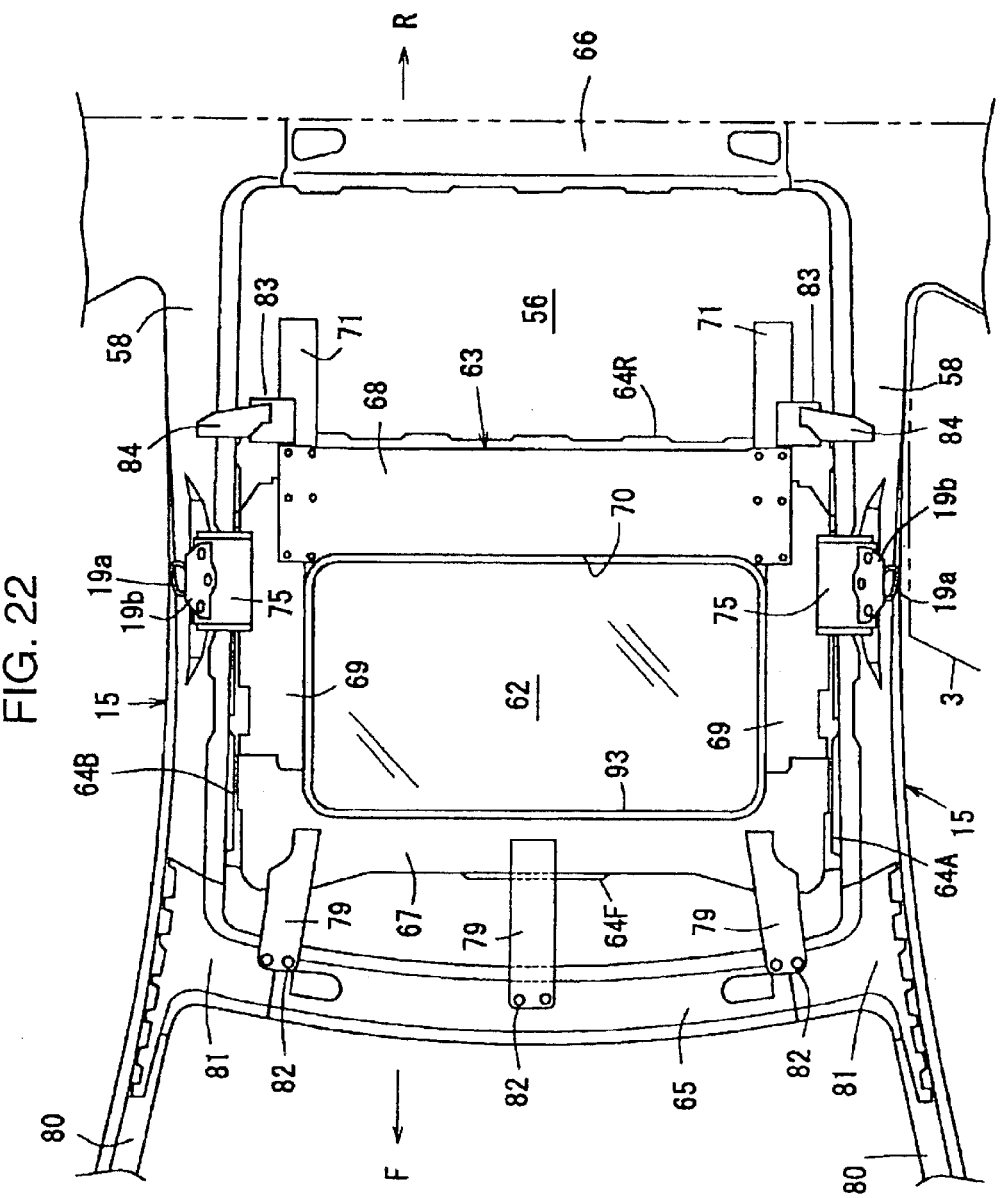
FIG. 22 is a plan view of a vehicle upper body structure according to still another embodiment of the present invention, seen from the inside of the vehicle cabin.

FIG. 22 is a plan view of a vehicle upper body structure according to still another embodiment of the present invention. In addition to the configuration of FIG. 13, a connection member 79 is provided which connects a middle part of the front header 65 in the vehicle-width directions and a middle part of the front cross member 67 of the sliding roof unit 63 in the vehicle-width directions. This means that in total, three such connection members 79 are provided which connect the front header 65 and the front cross member 67, thereby making load transmission efficiency higher.

In the vehicle upper body structure according to the embodiment of FIG. 22, other configuration, operation and advantages are the same as those according to the embodiment mentioned previously. Therefore, in FIG. 22, the same reference numerals and characters are used as those in the previous figures, and their detailed description is omitted.

With respect to the correspondence of the configuration according to the present invention to the aforementioned embodiments, the continuous door opening with no partition in the side part of the vehicle body according to the present invention corresponds to the door opening portion 15 with no center pillar according to the embodiments. In the same way, the roof opening frame corresponds to the frames of the sliding roof unit 63 (refer to the cross members 67, 68 and the supporting frames 69): the side part of the roof opening frame; the supporting frame 69: the roof rail; the roof rail inner 58: the reinforcement; the longitudinal impact bar 43: the door-side lock portion; the door latch 17: the vehicle body-side lock portion; the striker 19: the door lower-part locking mechanism; the door latch 18 and the striker 20: the locking mechanism at a front part of the rear door; the striker 29: the rear-side part the opening; the cross member 68 on the rear side. However, the present invention is not limited only to the configuration according to the aforementioned embodiments.

As a matter of course, for example, a sliding roof unit may be replaced with a canvas-top structure.

In the vehicle upper body structure according to the present invention, a load transmitting member which transmits a load given in the vehicle-width directions is provided at a side part of a roof opening frame (of either a sun roof or a canvas top) such that the load transmitting member is located between the roof opening frame and a position corresponding to free-end upper parts of front and rear doors which are kept closed. Therefore, this vehicle upper body structure takes advantage of the fact that a load (i.e., a load given from the outside to the inside of the vehicle-width directions) at the time when the doors are kept closed can be dispersed by allowing the load transmitting member to bear the load and transmit it to the roof opening frame, and thereby, the vehicle body of a non-center pillar vehicle with a roof opening can be made more rigid.

In summary, a vehicle upper body structure according to the present invention, in which a front door and a rear door cover a continuous door opening with no partition in a side part of a vehicle body so that the door opening is opened and closed, the front door is pivotally attached at a front part thereof to the vehicle body so that the front door is opened and closed, and the rear door is pivotally attached at a rear part thereof to the vehicle body so that the rear door is opened and closed, comprises: a roof opening which is formed in a roof portion of the vehicle body and through which a vehicle cabin leads to the outside of a vehicle; an opening and closing member which covers the roof opening so that the roof opening is opened and closed; a roof opening frame which supports the opening and closing member; and a load transmitting member which transmits a load given in the vehicle-width directions, the load transmitting member being disposed at a side part of the roof opening frame such that the load transmitting member is located between the roof opening frame and a position corresponding to free-end upper parts of both doors which are kept closed.

Herein, as the roof opening frame according to this configuration, either a roof for a sun roof or a roof for a canvas top may also be used. As for the load transmitting member, it may be disposed precisely sideways or inclined.

According to the above described configuration, the load transmitting member disperses a load (i.e., a load given from the outside to the inside of the vehicle-width directions) at the time when the doors are kept closed, by bearing the load and transmitting it to the roof opening frame, and thereby, the vehicle body of a non-center pillar vehicle with a roof opening becomes more rigid. This is advantageous to the vehicle, even when it is bumped at its side part.

According to an implementation of the present invention, the load transmitting member, in side view, overlaps with free-end parts of both doors which keep the door opening closed, in the front and rear directions of the vehicle.

According to this configuration, the load transmitting member overlaps with free-end upper parts of the doors in the front and rear directions of the vehicle. This makes it easy to transmit a load at the time when the doors are closed to the roof opening frame, allowing the load to disperse more effectively.

According to another implementation of the present invention, the load transmitting member is connected at one end thereof to the roof opening frame, and is connected at the other end thereof to a roof rail in the vicinity of free-end parts of both doors which are kept closed.

According to this configuration, the roof opening frame and the roof rail are joined together by the load transmitting member. This enables the roof opening frame to bear a load given in the vehicle-width directions, regardless of its direction, outward or inward, thereby making the vehicle body more rigid.

According to still another implementation of the present invention, a reinforcement extends in substantially the up and down directions in the vicinity of a free-end part of at least one of both doors; and the load transmitting member is connected to a roof rail so as to overlap, in side view, with an upper part of the reinforcement in the front and rear directions of the vehicle while both doors are kept closed.

Herein, as the reinforcement according to this configuration, either a longitudinal impact bar or a vertical reinforcement may also be used.

According to the above described configuration, the reinforcement is provided which reinforces the vicinity of free-end parts of the doors. This makes it possible for the doors to bear, more sufficiently, a load given in the vehicle-width directions, thereby making the vehicle body more rigid, especially against a side bump.

According to still another implementation of the present invention, a door-side lock portion is disposed at an upper part in the vicinity of a free end of at least one of both doors, a vehicle body-side lock portion is disposed in a position where a roof rail faces the door-side lock portion when the door is closed, and the door-side lock portion and the vehicle body-side lock portion are locked and unlocked; a door upper-part locking mechanism is provided which locks the door in the vehicle body; and the load transmitting member is connected to the vehicle body-side lock portion of the door upper-part locking mechanism.

Herein, as the door-side lock portion according to this configuration, a door latch may also be used; as the vehicle body-side lock portion, a striker.

According to the above described configuration, the load transmitting member is connected to the vehicle body-side lock portion of the door upper-part locking mechanism. This allows a load at the time when the doors are kept closed to be efficiently transmitted to the roof opening frame, thereby making the vehicle body more rigid. In addition, a better feeling of rigidity can be given to the doors while being kept closed.

According to still another implementation of the present invention, the reinforcement is connected at an upper part thereof to the door-side lock portion.

Herein, as the reinforcement according to this configuration, a longitudinal impact bar may also be used.

According to the above described configuration, the reinforcement and the load transmitting member are locked together when the doors are kept closed. This allows a load to be transmitted more smoothly, thereby making the vehicle body more rigid.

According to still another implementation of the present invention, the door upper-part locking mechanism includes a striker which is provided in the roof rail and has an arm bar protruding downward, and a door latch which is disposed at a free end-side upper part of the door, and latches and unlatches the arm bar of the striker; and as the load transmitting member, a gusset is used which is connected at one end thereof to the striker and is connected at the other end thereof to the roof opening frame.

According to this configuration, only the gusset may be used in a vehicle which has no roof opening, and thus, the door latch and the striker may be replaced with a single common component. This allows vehicle designs to be drawn more freely and also allows production costs to become lower.

According to still another implementation of the present invention, the striker and one end of the gusset are fixed together to the roof rail.

According to this configuration, there is no need to make any changes in the vehicle body and the striker so that they can be connected to the gusset. This allows production costs to become lower.

According to still another implementation of the present invention, a door lower-part locking mechanism is provided which locks a free-end lower part of the door in a side shell.

According to this configuration, free-end upper and lower parts of the door are locked at both upper and lower edge parts of the door opening, respectively. Thereby, the door unites with the roof opening frame and the side shell while the door is kept closed. As a result, the vehicle body becomes more rigid, particularly against torsion, allowing vehicle occupants to be kept safer when the vehicle is bumped at its side part.

According to still another implementation of the present invention, the door lower-part locking mechanism is connected to a lower part of a reinforcement.

According to this configuration, the vehicle body becomes more rigid, especially against a side bump.

According to still another implementation of the present invention, the load transmitting member is provided between a free-end upper part of the rear door and the roof opening frame; and a locking mechanism is provided which locks a rear part of the front door at a front part of the rear door.

According to this configuration, the roof opening frame can be put in a desirable position for occupants. In addition, the position in which the opening and closing member is put can be selected more freely, with the vehicle body being kept rigid.

According to still another implementation of the present invention, the roof opening frame is disposed at a predetermined distance from a front header in the front and rear directions; and the roof opening frame is connected at a front-end part thereof to the front header by means of a connection member.

According to this configuration, the space where a driving means (refer to a motor or a handle) which drives the opening and closing member is placed can be secured between the roof opening frame and the front header. In addition, a load can also be transmitted to the front header, thereby making the vehicle body more rigid.

According to still another implementation of the present invention, the roof opening frame includes rail portions on both sides, the rail portion extending in the front and rear directions of the vehicle and supporting a supporting portion of the opening and closing member so that the supporting portion slides on the rail portion; and the connection member is disposed on an extension line of the rail portion in the roof opening frame.

According to this configuration, a load can be transmitted and dispersed from the rail portion, which has a great rigidity, of the roof opening frame to the front header, through the connection member. This allows the vehicle body to become more rigid.

According to still another implementation of the present invention, the connection member is connected at the other end thereof astride to the front header of the vehicle body and a roof-portion component member which is adjacent to an end part in the vehicle-width directions of the front header.

According to this configuration, a load transmitted to the front header can be further transmitted to the roof portion. This promotes further dispersion of the load, allowing the vehicle body to become more rigid.

According to still another implementation of the present invention, the roof opening frame includes front and rear-side parts and vehicle-width direction-side parts which form a substantially rectangular opening; and the rear-side part of the opening is located behind the front-end part of the load transmitting member and overlaps forward with the rear-end part of the load transmitting member.

According to this configuration, the overlap structure allows a load given in the vehicle-width directions to be transmitted to the whole roof opening frame, through the load transmitting member. This promotes further dispersion of the load, allowing the vehicle body to become more rigid.

This application is based on Japanese patent application serial No. 2002-323226, filed in Japan Patent Office on Nov. 07, 2002, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle upper body structure, in which a front door and a rear door cover a continuous door opening with no partition in a side part of a vehicle body so that the door opening is opened and closed, the front door is pivotally attached at a front part thereof to the vehicle body so that the front door is opened and closed, and the rear door is pivotally attached at a rear part thereof to the vehicle body so that the rear door is opened and closed, comprising:
   a roof opening which is formed in a roof portion of the vehicle body and through which a vehicle cabin leads to the outside of a vehicle;
   an opening and closing member which covers said roof opening so that the roof opening is opened and closed;
   a roof opening frame which supports said opening and closing member; and
   a load transmitting member which transmits a load in the vehicle-width directions, said load transmitting member being disposed at a side part of said roof opening frame such that the load transmitting member is located between the roof opening frame and a position corresponding to free-end upper parts of both doors when they are in the closed position.

2. The vehicle upper body structure according to claim 1, wherein in said load transmitting member, in side view, overlaps with free-end parts of both doors which keep the door opening closed, in the front and rear directions of the vehicle.

3. The vehicle upper body structure according to claim 1, wherein said load transmitting member is connected at one end thereof to said roof opening frame, and is connected at the other end thereof to a roof rail in the vicinity of free-end parts of both doors when they are in the closed position.

4. The vehicle upper body structure according to claim 1, wherein:
   a reinforcement extends in substantially the up and down directions in the vicinity of a free-end part of at least one of both doors; and
   said load transmitting member is connected to a roof rail so as to overlap, in side view, with an upper part of said reinforcement in the front and rear directions of the vehicle when both doors are in the closed position.

5. The vehicle upper body structure according to claim 1, wherein:
   a door-side lock portion is disposed at an upper part in the vicinity of a free end of at least one of both doors, a vehicle body-side lock portion is disposed in a position where a roof rail faces said door-side lock portion when the door is closed, and the door-side lock portion and said vehicle body-side lock portion are locked and unlocked;

a door upper-part locking mechanism is provided which locks the door in the vehicle body; and said load transmitting member is connected to the vehicle body-side lock portion of said door upper-part locking mechanism.

6. The vehicle upper body structure according to claim 5, wherein said reinforcement is connected at an upper part thereof to said door-side lock portion.

7. The vehicle upper body structure according to claim 5, wherein:

said door upper-part locking mechanism includes a striker which is provided in the roof rail and has an arm bar protruding downward, and a door latch which is disposed at a free end-side upper part of the door, and latches and unlatches said arm bar of said striker; and as said load transmitting member, a gusset is used which is connected at one end thereof to the striker and is connected at the other end thereof to said roof opening frame.

8. The vehicle upper body structure according to claim 7, wherein said striker and one end of said gusset are fixed together to the roof rail.

9. The vehicle upper body structure according to claim 5, wherein a door lower-part locking mechanism is provided which locks a free-end lower part of the door in a side shell.

10. The vehicle upper body structure according to claim 9, wherein said door lower-part locking mechanism is connected to a lower part of a reinforcement.

11. The vehicle upper body structure according to claim 1, wherein:

said load transmitting member is provided between a free-end upper part of the rear door and said roof opening frame; and a locking mechanism is provided which locks a rear part of the front door at a front part of the rear door.

12. The vehicle upper body structure according to claim 1, wherein:

said roof opening frame is disposed at a predetermined distance from a front header in the front and rear directions; and the roof opening frame is connected at a front-end part thereof to the front header by means of a connection member.

13. The vehicle upper body structure according to claim 12, wherein:

said roof opening frame includes rail portions on both sides, said rail portion extending in the front and rear directions of the vehicle and supporting a supporting portion of said opening and closing member so that said supporting portion slides on the rail portion; and said connection member is disposed on an extension line of the rail portion in the roof opening frame.

14. The vehicle upper body structure according to claim 13, wherein said connection member is connected at the other end thereof astride to said front header of the vehicle body and a roof-portion component member which is adjacent to an end part in the vehicle-width directions of the front header.

15. The vehicle upper body structure according to claim 1, wherein:

said roof opening frame includes front and rear-side parts and vehicle-width direction-side parts which form a substantially rectangular opening; and the rear-side part of said opening is located behind the front-end part of said load transmitting member and overlaps forward with the rear-end part of the load transmitting member.

* * * * *